(12) United States Patent
Shin et al.

(10) Patent No.: US 12,468,343 B2
(45) Date of Patent: Nov. 11, 2025

(54) DISPLAY DEVICE

(71) Applicant: Samsung Display Co., Ltd., Yongin-si (KR)

(72) Inventors: Jaiku Shin, Hwaseong-si (KR); Sung Chul Choi, Hwaseong-si (KR); Sojeong La, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 140 days.

(21) Appl. No.: 17/943,697

(22) Filed: Sep. 13, 2022

(65) Prior Publication Data

US 2023/0195170 A1 Jun. 22, 2023

(30) Foreign Application Priority Data

Dec. 22, 2021 (KR) .................. 10-2021-0184892

(51) Int. Cl.
*G06F 1/16* (2006.01)
*G06F 3/044* (2006.01)
*G09F 9/30* (2006.01)
*H10K 59/40* (2023.01)

(52) U.S. Cl.
CPC .......... *G06F 1/1652* (2013.01); *G06F 1/1643* (2013.01); *G06F 1/1656* (2013.01); *G06F 3/0445* (2019.05); *G06F 3/0446* (2019.05); *G09F 9/301* (2013.01); *H10K 59/40* (2023.02)

(58) Field of Classification Search
None
See application file for complete search history.

(56) References Cited

U.S. PATENT DOCUMENTS

| 9,470,404 | B2 | 10/2016 | Lee et al. | |
| 10,966,329 | B2 | 3/2021 | Park et al. | |
| 2016/0234362 | A1* | 8/2016 | Moon | H04B 1/385 |
| 2019/0317360 | A1* | 10/2019 | Pan | G02F 1/1339 |
| 2019/0339739 | A1* | 11/2019 | Park | H04M 1/0218 |
| 2020/0068725 | A1* | 2/2020 | Park | H05K 5/0017 |
| 2021/0029837 | A1 | 1/2021 | Kim et al. | |
| 2021/0103313 | A1 | 4/2021 | Soh | |
| 2021/0265590 | A1 | 8/2021 | Wang et al. | |
| 2021/0359277 | A1 | 11/2021 | Jung et al. | |

FOREIGN PATENT DOCUMENTS

| KR | 1020190007788 A | 1/2019 |
| KR | 1020190025800 A | 3/2019 |
| KR | 1020200022064 A | 3/2020 |
| KR | 1020200034428 A | 3/2020 |
| KR | 1020210011541 A | 2/2021 |
| KR | 1020210034480 A | 3/2021 |
| KR | 1020210042214 A | 4/2021 |
| KR | 102261641 B1 | 6/2021 |

* cited by examiner

*Primary Examiner* — Laura C Powers
(74) *Attorney, Agent, or Firm* — CANTOR COLBURN LLP

(57) ABSTRACT

A display device includes a display panel, a first support plate disposed under the display panel, a first bracket disposed under the first support plate, a second bracket disposed under the first support plate and horizontally spaced apart from the first bracket, and a plurality of cushion layers disposed in a first groove defined on an upper surface of a portion of the first bracket adjacent to the second bracket and a second groove defined on an upper surface of a portion of the second bracket adjacent to the first bracket.

21 Claims, 23 Drawing Sheets

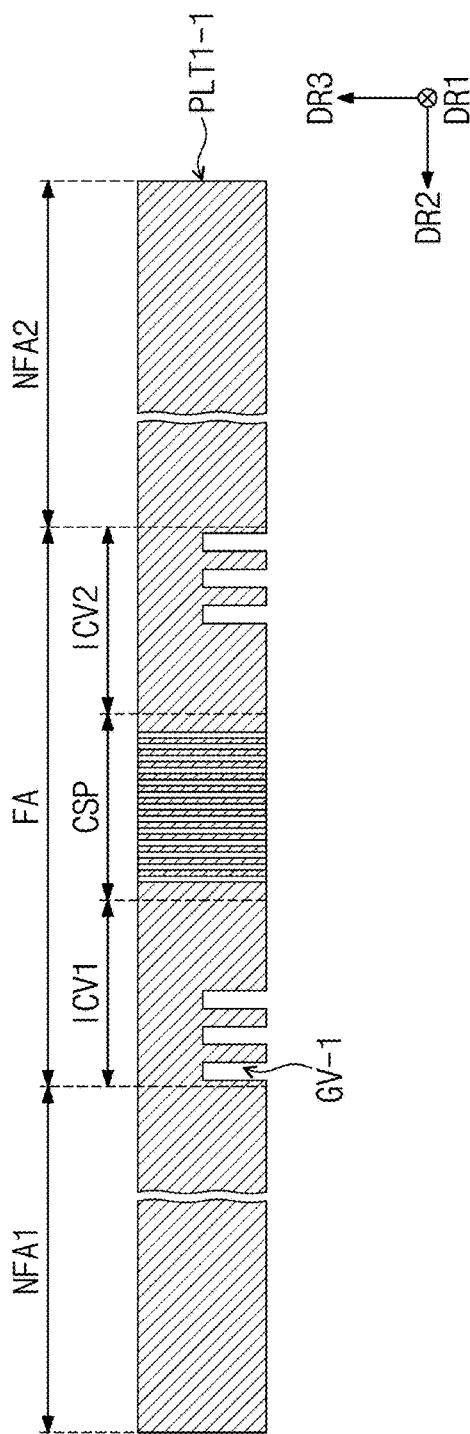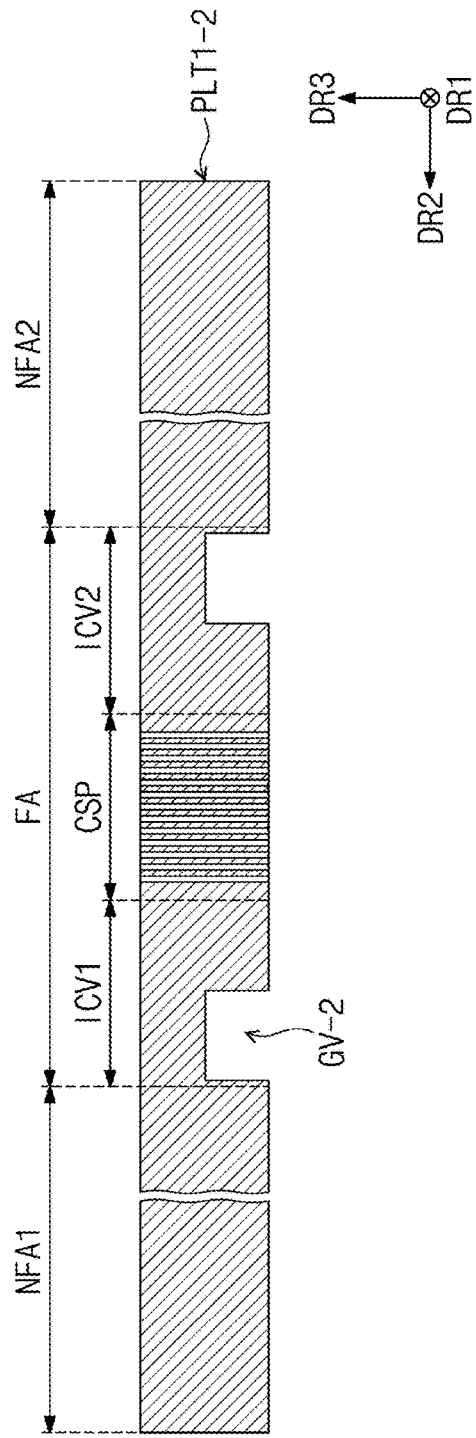

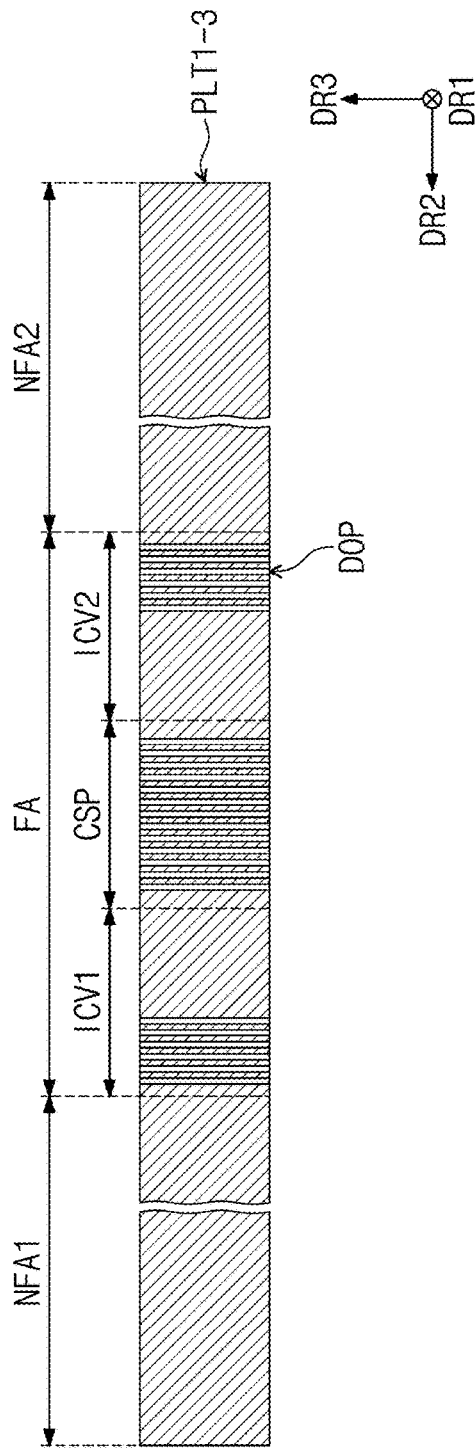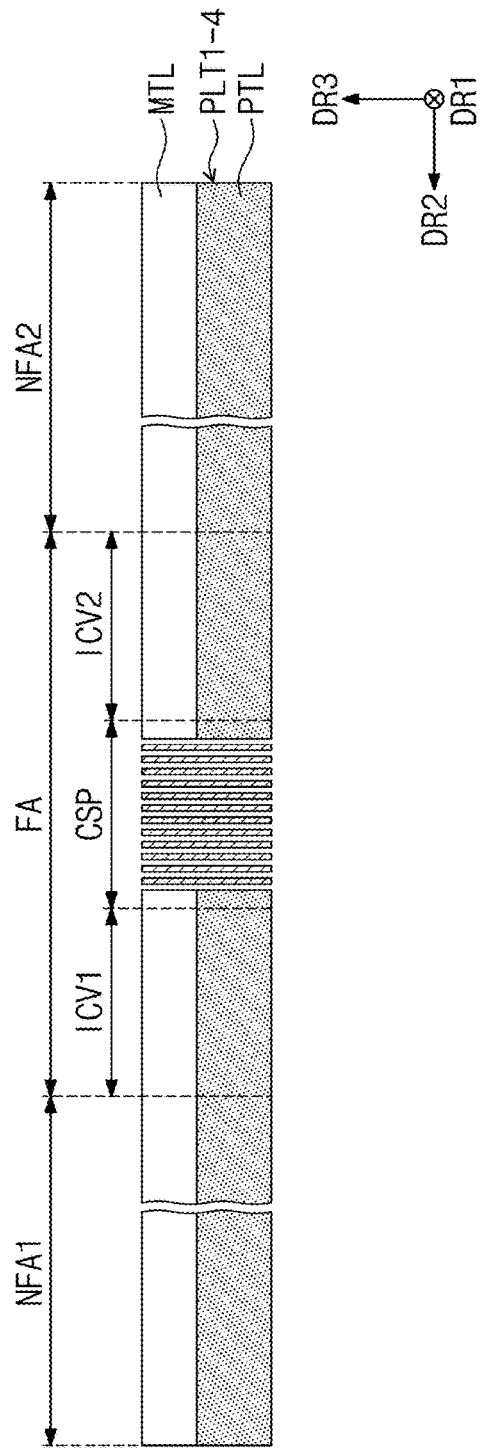

DISPLAY DEVICE

This application claims priority to Korean Patent Application No. 10-2021-0184892, filed on Dec. 22, 2021, and all the benefits accruing therefrom under 35 U.S.C. § 119, the content of which in its entirety is herein incorporated by reference.

BACKGROUND

1. Field

The disclosure relates to a display device.

2. Description of the Related Art

In general, a display device includes a display module for displaying an image and a support part for supporting the display module. The display module may include a display panel that displays an image, a window disposed on the display panel to protect the display panel from external scratches and impacts, and a protective layer disposed below the display panel to protect the display panel from external impacts. The support part may have greater rigidity than the display module and supports the display module.

Recently, with the development of display device technology, flexible display devices that may be transformed into various forms are being developed.

SUMMARY

A flexible display device includes a flexible display module that may be foldable or rollable. Among the flexible display modules, a support part disposed under a display module foldable around a folding axis has a structure that allows the support art to be folded together with the display module. Accordingly, it is desired for the support part to be folded more easily.

Embodiments of the disclosure provide a display device capable of more easily folding a display module into a dumbbell shape.

An embodiment of the invention provides a display device including: a display panel; a first support plate disposed under the display panel; a first bracket disposed under the first support plate; a second bracket disposed under the first support plate and horizontally spaced apart from the first bracket; and a plurality of cushion layers disposed in a first groove defined on an upper surface of a portion of the first bracket adjacent to the second bracket and a second groove defined on an upper surface of a portion of the second bracket adjacent to the first bracket.

In an embodiment of the invention, a display device includes: a display panel; a first support plate disposed under the display panel; a first second support plate disposed under the first support plate; a second second support plate disposed below the first support plate and horizontally spaced apart from the first second support plate; a first bracket disposed under the first second support plate; a second bracket disposed under the second second support plate; and a cushion layer disposed in a groove defined in an upper surface of a portion of the first bracket adjacent to the second bracket, where an opening part is defined in a portion of the first second support plate to overlap a boundary between the groove and the upper surface of the first bracket where the groove is not defined.

In an embodiment of the invention, a display device includes: a display panel; a first support plate disposed under the display panel; a second support plate disposed below the first support plate; a digitizer disposed under the second support plate; a first bracket disposed under the digitizer; a second bracket disposed under the digitizer and horizontally spaced apart from the first bracket; and a plurality of cushion layers disposed in a first groove defined in an upper surface of the first bracket and a second groove defined in an upper surface of the second bracket, where an opening part is defined in a portion of the second support plate to overlap a boundary between the first groove and an upper surface of the first bracket where the first groove is not defined, and a dummy groove is defined in a lower surface of the digitizer to overlap the opening part.

BRIEF DESCRIPTION OF THE DRAWINGS

The above and other features of the invention will become more apparent by describing in further detail embodiments thereof with reference to the accompanying drawings, in which:

FIGS. 19 to 23 are views showing the configurations of the first support plate according to various embodiments of the invention.

DETAILED DESCRIPTION

Figure 1:
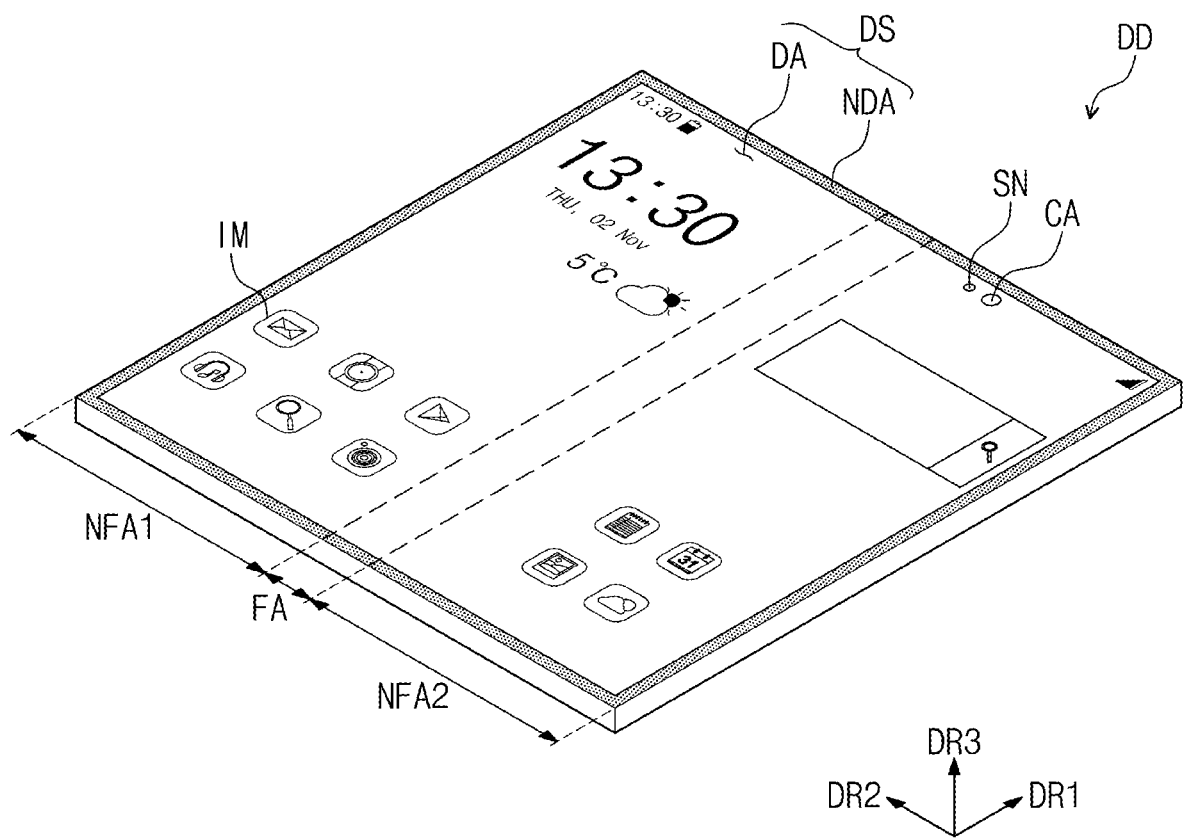
FIG. 1 is a perspective view of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when an element (or region, layer, part, etc.) is referred to as being "on", "connected to", or "coupled to" another element, it means that it may be directly placed on/connected to/coupled to other components, or a third component may be arranged therebetween.

Like reference numerals refer to like elements. Additionally, in the drawings, the thicknesses, proportions, and dimensions of components are exaggerated for effective description.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that the terms "first" and "second" are used herein to describe various components but these components should not be limited by these terms. The above terms are used only to distinguish one component from another. For example, a first component may be referred to as a second component and vice versa without departing from the scope of the invention. The terms of a singular form may include plural forms unless otherwise specified.

In addition, terms such as "below", "the lower side", "on", and "the upper side" are used to describe a relationship of configurations shown in the drawing. The terms are described as a relative concept based on a direction shown in the drawing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. In addition, terms such as terms defined in commonly used dictionaries should be interpreted as having a meaning consistent with the meaning in the context of the related technology, and it should not be construed in an overly ideal or overly formal sense unless explicitly defined here.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
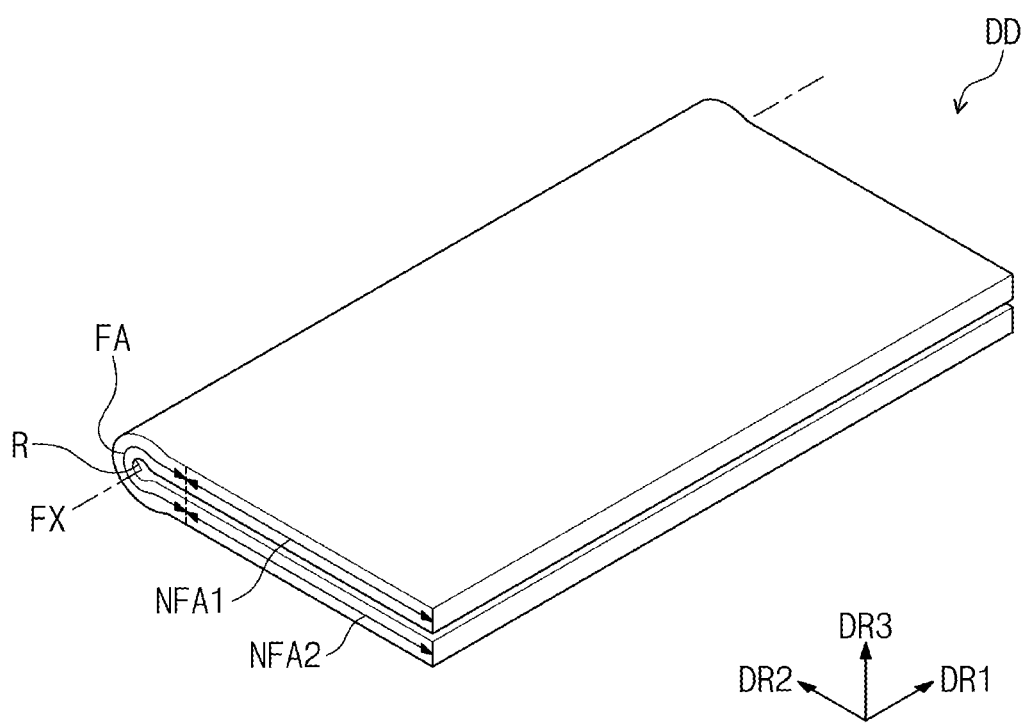
FIG. 2 is a view illustrating the display device shown in FIG. 1 in folded state.

FIG. 1 is a perspective view of a display device according to an embodiment of the invention. FIG. 2 is a view illustrating the display device shown in FIG. 1 in a folded state.

Referring to FIG. 1, an embodiment of a display device DD may have a rectangular shape with long sides extending in a first direction DR1 and short sides extending in a second direction DR2 intersecting the first direction DR1. However, the embodiment of the invention is not limited thereto, and alternatively, the display device DD may have various shapes such as a circle and a polygon. The display device DD may be a flexible display device.

Herein, the direction substantially perpendicular to the plane defined by the first direction DR1 and the second direction DR2 is defined as the third direction DR3. In addition, "when viewed from a plane" or "when viewed in a plan view" may mean a state viewed from the third direction DR3 or in a plane view in the third direction DR3.

The display device DD may include a folding area FA and a plurality of non-folding areas NFA1 and NFA2 adjacent to the folding area FA. The non-folding areas NFA1 and NFA2 may include a first non-folding area NFA1 and a second non-folding area NFA2. The folding area FA may be disposed between the first non-folding area NFA1 and the second non-folding area NFA2. The folding area FA, the first non-folding area NFA1, and the second non-folding area NFA2 may be arranged in the second direction DR2.

In an embodiment, for example, the display device DD may include a single folding area FA and two non-folding areas NFA1 and NFA2 as shown in FIG. 1, but the number of folding area FA and non-folding areas NFA1 and NFA2 is not limited thereto. In an alternative embodiment, for example, the display device DD may include more than two non-folding areas and a plurality of folding areas disposed between the non-folding areas.

The upper surface of the display device DD may be defined as a display surface DS, and the display surface DS may have a plane defined by the first direction DR1 and the second direction DR2. The images IM generated by the display device DD may be provided to the user through the display surface DS.

The display surface DS may include a display area DA and a non-display area NDA around the display area DA. The display area DA may display an image, and the non-display area NDA may not display an image. The non-display area NDA may surround the display area DA and may define an outline portion of the display device DD printed in a predetermined color.

The display device DD may include at least one sensor SN and at least one camera CA. The sensor SN and the camera CA may be adjacent to the edge of the display device DD. The sensor SN and the camera CA may be disposed in the display area DA adjacent to the non-display area NDA. In an embodiment, the sensor SN and the camera CA may be disposed in the second non-folding area NFA2, but is not limited thereto. Alternatively, and the sensor SN and the camera CA may be disposed in the first non-folding area NFA1.

Light may be transmitted through portions of the display device DD in which the sensor SN and the camera CA are disposed to be provided to the camera CA and the sensor SN. In an embodiment, for example, the sensor SN may be a proximity sensor, but the type of the sensor SN is not limited thereto. The camera CA may capture an external image. A plurality of sensors SN and cameras CA may be provided.

Referring to FIG. 2, an embodiment of the display device DD may be a foldable display device DD that may be folded or unfolded. In an embodiment, for example, the folding area FA may be bent based on a folding axis FX parallel to the first direction DR1, so that the display device DD may be folded. The folding axis FX may be defined as a long axis parallel to a long side of the display device DD. However, the embodiment of the invention is not limited thereto, and alternatively, the folding axis FX may be defined as a short axis parallel to the short side, and the display device DD may be folded around the folding axis FX parallel to the short side.

In a state where the display device DD is folded, the first non-folding area NFA1 and the second non-folding area NFA2 face each other, and the display device DD may be in-folded such that the display surface DS is not exposed to the outside. However, embodiments of the invention are not limited thereto. In an embodiment, for example, the display device DD may be out-folded such that the display surface DS is exposed to the outside around the folding axis FX.

In an embodiment, a distance between the first non-folding area NFA1 and the second non-folding area NFA2 may be less than a diameter of a circle defined by a radius of curvature R of the folding area FA. In such an embodiment, the folding area FA is folded in a dumbbell shape, and the distance between the first non-folding area NFA1 and the second non-folding area NFA2 may be closer as being away from the folding area FA.

Figure 3:
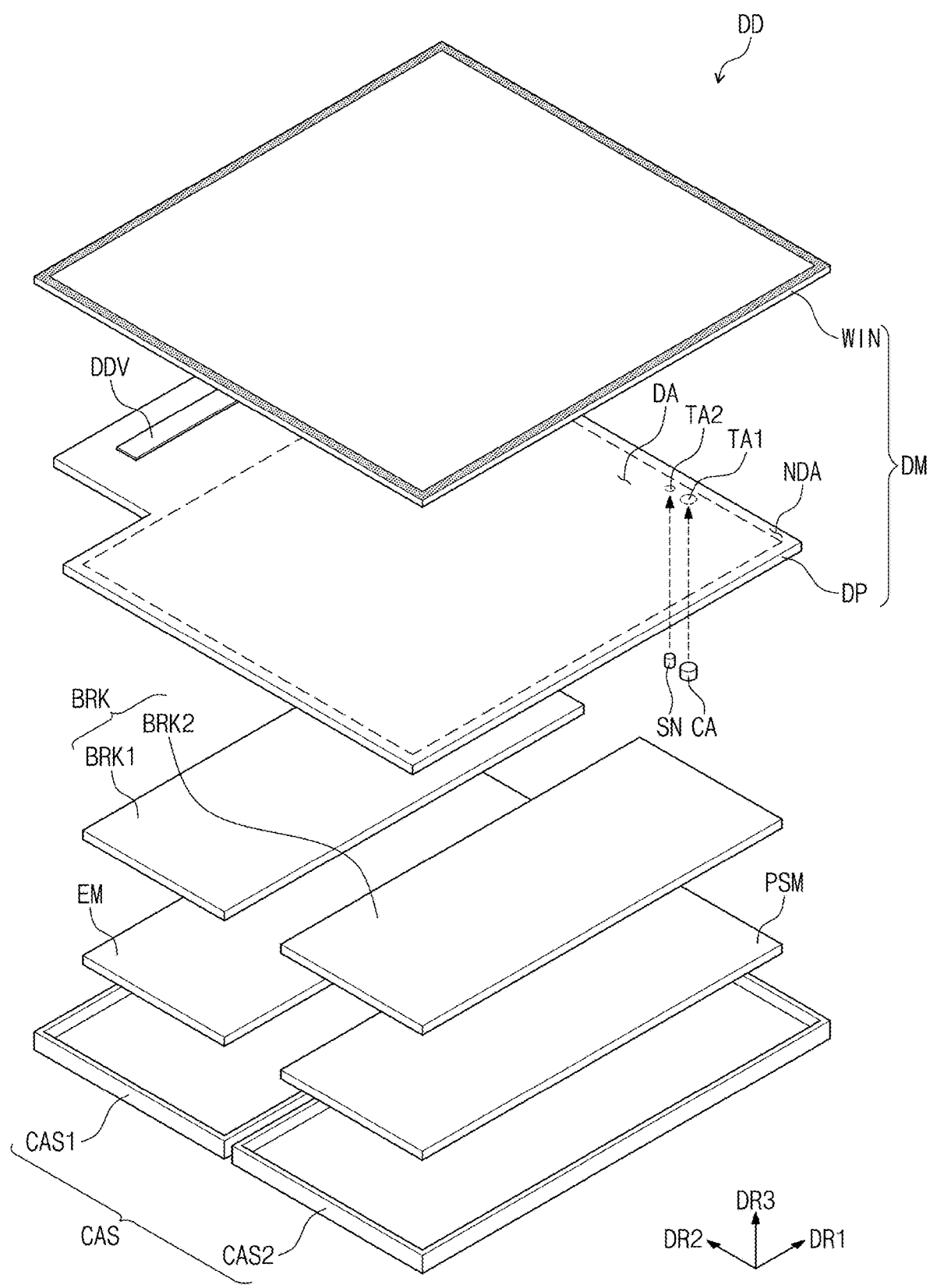
FIG. 3 is an exploded perspective view of the display device shown in FIG. 1.

FIG. 3 is an exploded perspective view of the display device shown in FIG. 1.

Referring to FIG. 3, an embodiment of the display device DD may include a display module DM, a camera CA, a sensor SN, a bracket BRK, an electronic module EM, a power module PSM, and a case CAS.

The display module DM may include a window WIN and a display panel DP. In an embodiment, for example, in FIG. 3, a window WIN and a display panel DP among the stacked structures of the display module DM are shown, but the display module DM may further include other various components in addition to the window WIN and the display panel DP. A detailed stacked structure of the display module DM will be described in detail below.

The window WIN may defined or provide the front surface of the display device DD. The window WIN may transmit the image generated by the display panel DP and provide the image to the user.

The display panel DP may include a display area DA and a non-display area NDA corresponding to the display area DA (refer to FIG. 1) and the non-display area NDA (refer to FIG. 1) of the display device DD. Herein, "the region/part and the region/part correspond" means the region/part overlapping each other and may not be limited to a case having a same area as each other.

A first transmissive area TA1 and a second transmissive area TA2 may be defined in the display panel DP. The first transmissive area TA1 and the second transmissive area TA2 may have higher light transmittance than surrounding areas. The camera CA may be disposed under or to overlap the first transmissive area TA1, and the sensor SN may be disposed under or to overlap the second transmissive area TA2. Light passing through the first and second transmissive areas TA1 and TA2 may be provided to the camera CA and the sensor SN.

The display module DM may include a data driver DDV disposed on the non-display area NDA of the display panel DP. The data driver DDV may be manufactured in the form of an integrated circuit chip and mounted on the non-display area NDA. However, the embodiment of the invention is not limited thereto, and the alternatively, data driver DDV may be mounted on a flexible circuit board connected to the display panel DP.

The bracket BRK may be disposed under the display panel DP. The bracket BRK may include a first bracket BRK1 and a second bracket BRK2. The first bracket BRK1 and the second bracket BRK2 may extend in the first direction DR1 and may be arranged in the second direction DR2. Although not shown in the drawing, a support part may be disposed between the bracket BRK and the display panel DP, and the bracket BRK may be connected to the support part. This configuration will be described in detail below.

The electronic module EM and the power module PSM may be disposed under the first and second brackets BRK1 and BRK2. Although not shown in the drawing, the electronic module EM and the power module PSM may be connected to each other through a separate flexible circuit board. The electronic module EM may control the operation of the display module DM. The power module PSM may supply power to the electronic module EM.

The case CAS may accommodate the display module DM, the bracket BRK, the electronic module EM, and the power module PSM. The case CAS may include two cases, e.g., a first case CAS1 and a second case CAS2 to fold the display module DM. The first and second cases CAS1 and CAS2 may extend in the first direction DR1 and may be arranged in the second direction DR2.

Although not shown, the display device DD may further include a hinge structure for rotating the first and second cases CAS1 and CAS2 and the first and second cases CAS1 and CAS2 are connected to each other via the hinge structure, and the first and second cases CAS1 and CAS2 are folded by the hinge structure. The case CAS may protect the display module DM, the bracket BRK, the electronic module EM, and the power module PSM. The bracket BRK, the electronic module EM, the power module PSM, and the case CAS may be defined as a set structure constituting the periphery of the display module DM.

Figure 4:
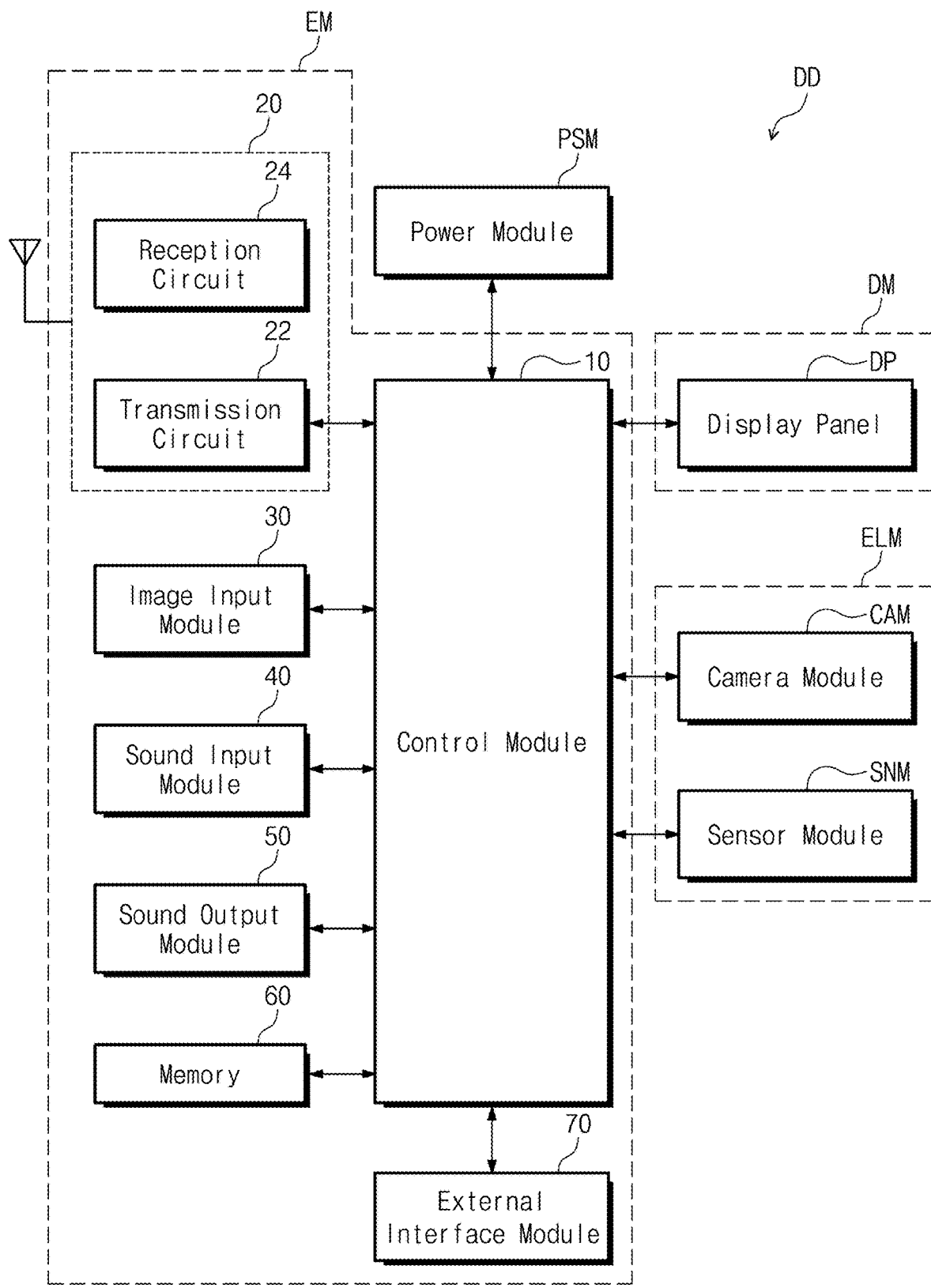
FIG. 4 is a block diagram of the display device shown in FIG. 3.

FIG. 4 is a block diagram of the display device shown in FIG. 3.

Referring to FIG. 4, an embodiment of the display device DD may include an electronic module EM, a power module PSM, a display module DM, and an electro-optical module ELM. The electronic module EM may include a control module 10, a wireless communication module 20, an image input module 30, a sound input module 40, a sound output module 50, a memory 60, and an external interface module 70. The modules of the electronic module EM may be mounted on a circuit board or electrically connected through a flexible circuit board. The electronic module EM may be electrically connected to the power module PSM.

The control module 10 may control the overall operation of the display device DD. In an embodiment, for example, the control module 10 may activate or deactivate the display module DM according to a user input. The control module 10 may control the image input module 30, the sound input module 40, the sound output module 50, and the like in accordance with a user input. The control module 10 may include at least one microprocessor.

The wireless communication module 20 may transmit/receive a wireless signal to/from another terminal using a Bluetooth or Wi-Fi line. The wireless communication module 20 may transmit/receive a voice signal using a general communication line. The wireless communication module 20 may include a transmission circuit 22 for modulating and transmitting a signal to be transmitted, and a reception circuit 24 for demodulating a received signal.

The image input module 30 may process an image signal and convert the image signal into image data that may be displayed on the display module DM. The sound input module 40 may receive an external sound signal by a microphone in a recording mode, or a voice recognition mode, and convert the received signal into electrical voice data. The sound output module 50 may convert sound data received from the wireless communication module 20 or sound data stored in the memory 60 and output the converted sound data to the outside.

The external interface module 70 may serve as an interface connected to an external charger, a wired/wireless data port, a card socket (e.g., a memory card, and a SIM/UIM card), or the like.

The power module PSM may supply power used for the overall operation of the display device DD. The power module PSM may include a conventional battery device.

The electro-optical module ELM may be an electronic component that outputs or receives an optical signal. The electro-optical module ELM may transmit or receive an optical signal through a partial area of the display module DM. In an embodiment, the electro-optical module ELM may include a camera module CAM and a sensor module SNM. The camera module CAM may include the camera CA shown in FIG. 3. The sensor module SNM may include the sensor SN shown in FIG. 3.

Figure 5:
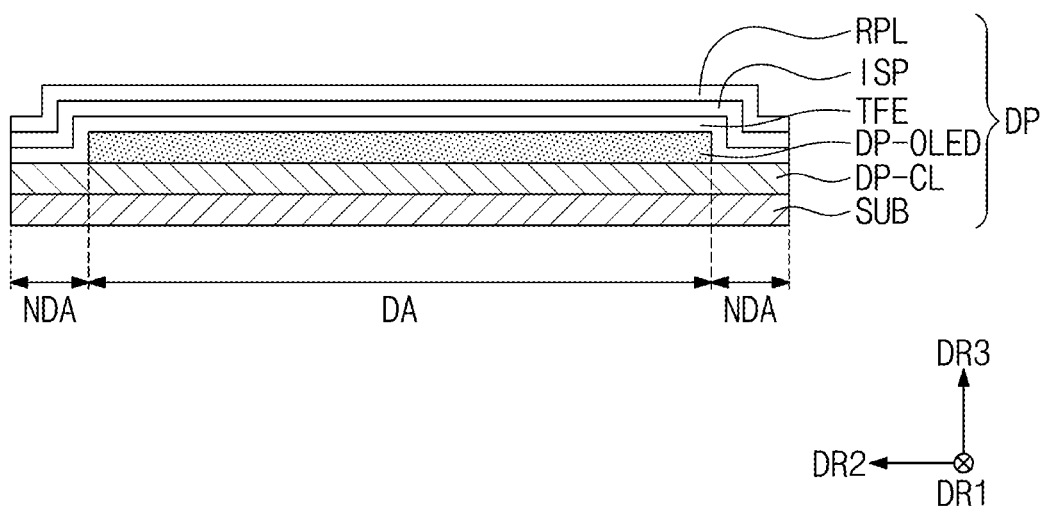
FIG. 5 is a schematic cross-sectional view of the display module shown in FIG. 3.

FIG. 5 is a schematic cross-sectional view of the display module shown in FIG. 3.

FIG. 5 illustrates a cross-section of the display module DM as viewed from the first direction DR1.

Referring to FIG. 5, an embodiment of the display panel DP may be a flexible display panel. In an embodiment, the display panel DP may be a light emitting display panel, and is not particularly limited. In an embodiment, for example, the display panel DP may be an organic light emitting display panel or an inorganic light emitting display panel. The light emitting layer of the organic light emitting display panel may include an organic light emitting material. The light emitting layer of the inorganic light emitting display panel may include quantum dot, quantum rod, and the like. Hereinafter, for convenience of description, embodiments where the display panel DP is the organic light emitting display panel will be described in detail.

The display panel DP may include a substrate SUB, a circuit element layer DP-CL, a display element layer DP-OLED, a thin film encapsulation layer TFE, an input sensing unit ISP, and an anti-reflection layer RPL.

The substrate SUB may include a display area DA and a non-display area NDA around the display area DA, corresponding to those of the display panel DP. The display element layer DP-OLED may be disposed on the display area DA. The substrate SUB may include a flexible plastic material. In an embodiment, for example, the substrate SUB may include polyimide (PI).

The display element layer DP-OLED may be disposed on the circuit element layer DP-CL. The circuit element layer DP-CL may include transistors. The display element layer DP-OLED may include light emitting elements connected to transistors.

The thin film encapsulation layer TFE may be disposed on a display element layer DP-OLED. The thin film encapsulation layer TFE may be disposed on the circuit element layer DP-CL to cover the display element layer DP-OLED. The thin film encapsulation layer TFE may protect the light emitting elements from foreign substances such as moisture/oxygen and dust particles.

The input sensing unit ISP may be disposed on the thin film encapsulation layer TFE. The input sensing unit ISP may include a plurality of sensors (not shown) for sensing an external input. The sensors may sense an external input in a capacitive manner. The input sensing unit ISP may be directly formed on the thin film encapsulation layer TFE when the display panel DP is manufactured. However, the embodiment of the invention is not limited thereto, and alternatively, the input sensing unit ISP may be manufactured as a separate panel and attached to the thin film encapsulation layer TFE by an adhesive layer.

An anti-reflection layer RPL may be disposed on an input sensing unit ISP. The anti-reflection layer RPL may be directly formed on the input sensing unit ISP when the display panel DP is manufactured. The anti-reflection layer RPL may be defined as an external light anti-reflection layer. The anti-reflection layer RPL may reduce reflectance of external light incident on the display panel DP from above the display device DD.

Figure 6:
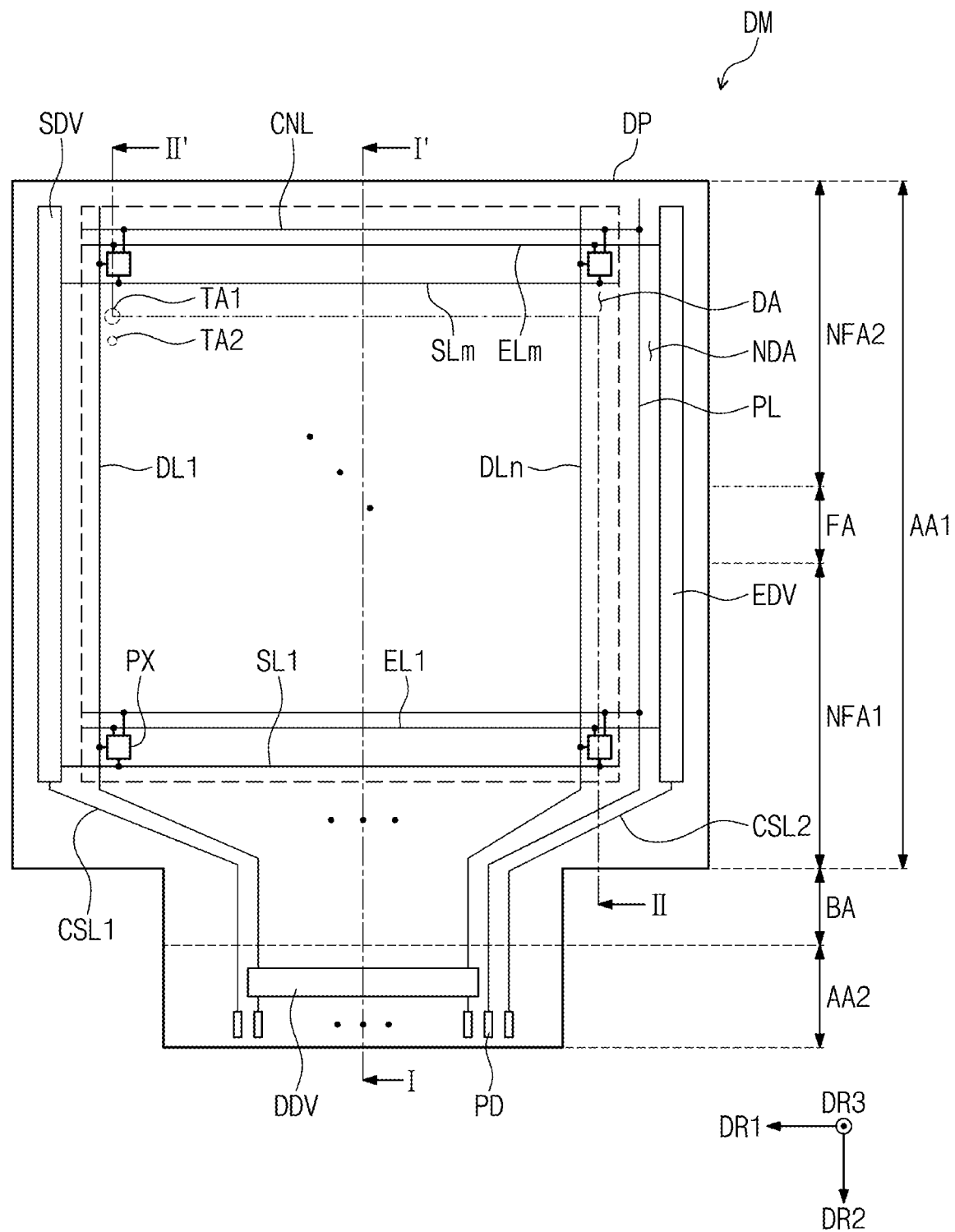
FIG. 6 is a plan view of the display panel shown in FIG. 3.

FIG. 6 is a plan view of the display panel illustrated in FIG. 3.

Referring to FIG. 6, an embodiment of the display device DD may include a display panel DP, a scan driver SDV, a data driver DDV, and an emission driver EDV.

The display panel DP may include a first area AA1, a second area AA2, and a bending area BA disposed between the first area AA1 and the second area AA2. The bending area BA may extend in the first direction DR1, and the first area AA1, the bending area BA, and the second area AA2 may be arranged in the second direction DR2.

The first area AA1 may include the display area DA and the non-display area NDA around the display area DA. The non-display area NDA may surround the display area DA. The display area DA may be an area for displaying an image, and the non-display area NDA may be an area for not displaying an image. The second area AA2 and the bending area BA may be areas that do not display an image.

When viewed from the third direction DR3, the first area AA1 may include a first non-folding area NFA1, a second non-folding area NFA2, and a folding area FA between the first non-folding area NFA1 and the second non-folding area NFA2. The first and second non-folding areas NFA1 and NFA2 and the folding area FA may correspond to the first and second non-folding areas NFA1 and NFA2 and the folding area FA of the display device DD shown in FIG. 1.

The first and second transmissive areas TA1 and TA2 may be defined in the display area DA and the second non-folding area NFA2.

The first area AA1 may be bent and folded based on the above-described folding axis FX. In an embodiment, for example, as the folding area FA of the first area AA1 is folded based on the above-described folding axis FX, the display panel DP may be folded.

The display panel DP may include a plurality of pixels PX, a plurality of scan lines SL1 to SLm, a plurality of data lines DL1 to DLn, a plurality of light emitting lines EL1 to ELm, first and second control lines CSL1 and CSL2, a power line PL, a plurality of connection lines CNL, and a plurality of pads PD. Here, m and n are natural numbers. The pixels PX are disposed in the display area DA and may be connected to the scan lines SL1 to SLm, the data lines DL1 to DLn, and the emission lines EL1 to ELm.

The scan driver SDV and the emission driver EDV may be disposed in the non-display area NDA. The scan driver SDV and the emission driver EDV may be disposed in the non-display area NDA adjacent to opposing sides of the first area AA1, e.g., sides opposite to each other in the first direction DR1. The data driver DDV may be disposed in the second area AA2. The data driver DDV may be manufactured in the form of an integrated circuit chip and mounted on the second area AA2.

The scan lines SL1 to SLm may extend in the first direction DR1 to be connected to the scan driver SDV. The data lines DL1 to DLn may extend in the second direction DR2 and may be connected to the data driver DDV via the bending area BA. The data driver DDV may be connected to the pixels PX through the data lines DL1 to DLn. The data driver DDV may be defined as a driver. The emission lines EL1 to ELm may extend in the first direction DR1 to be connected to the emission driver EDV.

The power line PL may extend in the second direction DR2 and be disposed in the non-display area NDA. In an embodiment, the power line PL may be disposed between the display area DA and the emission driver EDV, but is not limited thereto, and alternatively, the power line PL may be disposed between the display area DA and the scan driver SDV.

The power line PL may extend to the second area AA2 via the bending area BA. The power line PL may extend toward a lower end of the second area AA2 when viewed in a plan view. The power line PL may receive a driving voltage.

The connection lines CNL may extend in a first direction DR1 and may be arranged in a second direction DR2. The connection lines CNL may be connected to the power line PL and the pixels PX. The driving voltage may be applied to the pixels PX through the power line PL and the connection lines CNL connected to each other.

The first control line CSL1 may be connected to the scan driver SDV and may extend toward the lower end of the second area AA2 through the bending area BA. The second control line CSL2 may be connected to the emission driver EDV and may extend toward the lower end of the second area AA2 through the bending area BA. The data driver DDV may be disposed between the first control line CSL1 and the second control line CSL2.

When viewed in a plan view, the pads PD may be disposed adjacent to a lower end of the second area AA2. The data driver DDV, the power line PL, the first control line CSL1, and the second control line CSL2 may be connected to the pads PD.

The data lines DL1 to DLn may be connected to corresponding pads PD through a data driver DDV. In an embodiment, for example, the data lines DL1 to DLn may be connected to the data driver DDV, and the data driver DDV may be connected to the pads PD respectively corresponding to the data lines DL1 to DLn.

Although not shown in the drawing, a printed circuit board may be connected to the pads PD, and a timing controller and a voltage generator may be disposed on the printed circuit board. The timing controller may be manufactured as an integrated circuit chip and mounted on a printed circuit board. The timing controller and the voltage generator may be connected to the pads PD through a printed circuit board.

The timing controller may control operations of the scan driver SDV, the data driver DDV, and the emission driver EDV. The timing controller may generate a scan control signal, a data control signal, and an emission control signal in response to control signals received from the outside. The voltage generator may generate a driving voltage.

The scan control signal may be provided to the scan driver SDV through the first control line CSL1. The emission control signal may be provided to the emission driver EDV through the second control line CSL2. The data control signal may be provided to a data driver DDV. The timing controller receives the image signals from the outside, and converts the data format of the image signals to match the interface specification with the data driver DDV, and provides the converted image data to the data driver DDV.

The scan driver SDV may generate a plurality of scan signals in response to the scan control signal. The scan signals may be applied to the pixels PX through the scan lines SL1 to SLm. The scan signals may be sequentially applied to the pixels PX.

The data driver DDV may generate a plurality of data voltages corresponding to the image signals in response to the data control signal. The data voltages may be applied to the pixels PX through the data lines DL1 to DLn. The emission driver EDV may generate a plurality of emission signals in response to the emission control signal. The emission signals may be applied to the pixels PX through the emission lines EL1 to ELm.

The pixels PX may be provided with the data voltages in response to the scan signals. The pixels PX may display an image by emitting light having luminance corresponding to data voltages in response to emission signals. The emission time of the pixels PX may be controlled by emission signals.

Figure 7:
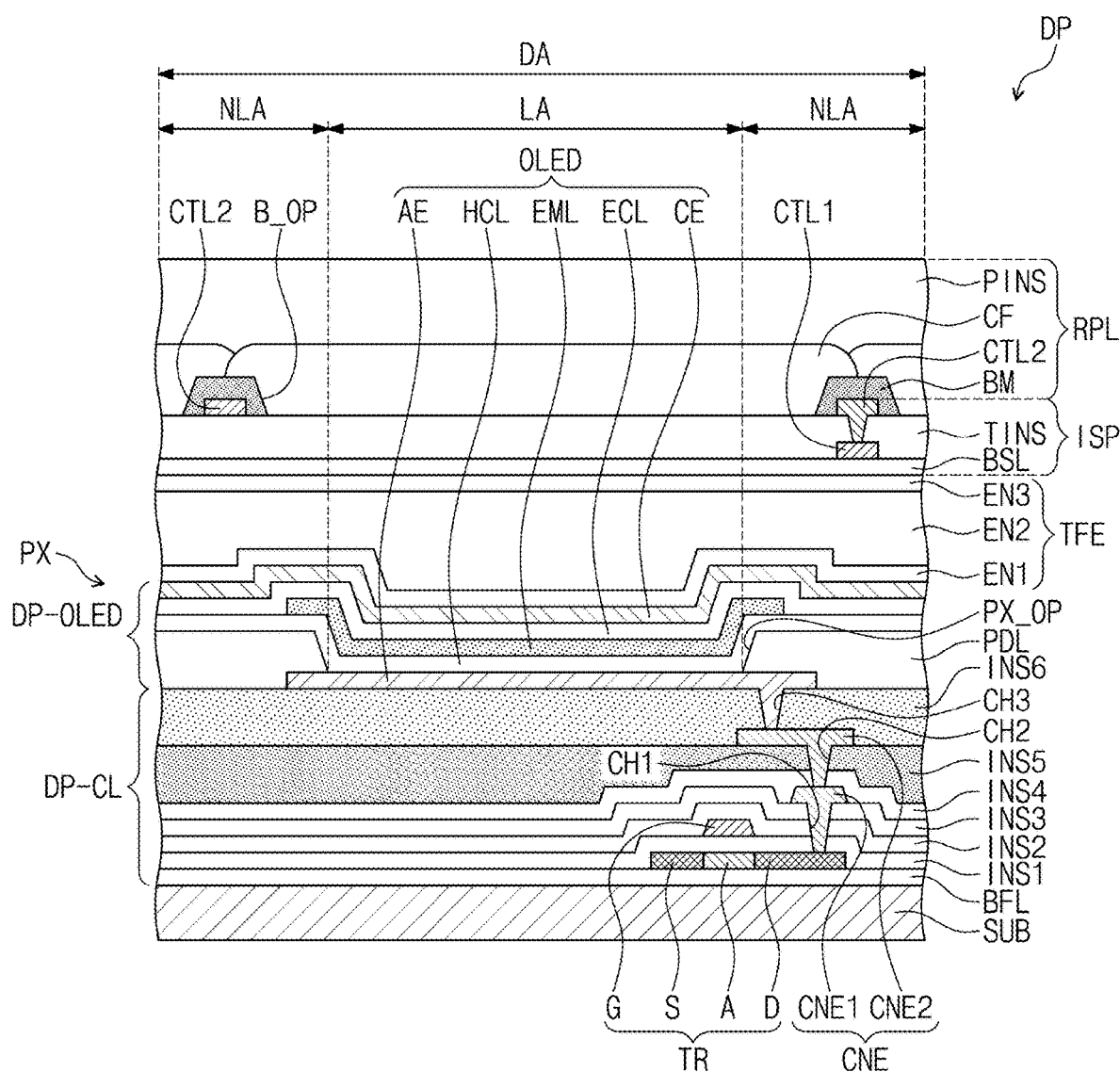
FIG. 7 is a diagram exemplarily illustrating a cross-section of a display panel corresponding to one pixel illustrated in FIG. 6.

FIG. 7 is a diagram exemplarily illustrating a cross-section of a display panel corresponding to one pixel illustrated in FIG. 6.

Referring to FIG. 7, in an embodiment, the pixel PX may include a transistor TR and a light emitting element OLED. A light emitting element OLED may include a first electrode AE (or anode), a second electrode CE (or cathode), a hole control layer HCL, an electron control layer ECL, and a light emitting layer EML.

The transistor TR and the light emitting element OLED may be disposed on the substrate SUB. In FIG. 7, a portion corresponding to one transistor TR is illustrated, but substantially, the pixel PX may include a plurality of transistors and at least one capacitor for driving the light emitting element OLED.

The display area DA may include an emission area LA corresponding to each of the pixels PX and a non-emission area NLA around the emission area LA. The light emitting element OLED may be disposed in the emission area LA.

A buffer layer BFL may be disposed on the substrate SUB, and may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a high doping area and a low doping area. The conductivity of the high doping area is greater than that of the low doping area, and may substantially serve as a source electrode and a drain electrode of the transistor TR. The low doping area may substantially correspond to the active (or channel) of the transistor.

The source S, active A, and drain D of the transistor TR may be formed from or defined by the semiconductor pattern. The first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

The connection electrode CNE may include a first connection electrode CNE1 and a second connection electrode CNE2 to connect the transistor TR and the light emitting element OLED. The first connection electrode CNE1 may be disposed on the third insulating layer INS3, and may be connected to the drain D through a first contact hole CH1 defined in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

A sixth insulating layer INS6 may be disposed on the second connection electrode CNE2. A portion from the buffer layer BFL to the sixth insulating layer INS6 may be collectively defined as a circuit element layer DP-CL. The first to sixth insulating layers INS' to INS6 may be inorganic or organic layers.

The first electrode AE may be disposed on the sixth insulating layer INS6. The first electrode AE may be connected to the second connection electrode CNE2 through a third contact hole CH3 defined in the sixth insulating layer INS6. A pixel defining film PDL in which an opening part PX_OP for exposing a predetermined portion of the first electrode AE is defined may be disposed on the first electrode AE and the sixth insulating layer INS6.

The hole control layer HCL may be disposed on the first electrode AE and the pixel defining film PDL. The hole control layer HCL may include a hole transport layer and a hole injection layer.

The light emitting layer EML may be disposed on the hole control layer HCL. The light emitting layer EML may be disposed in an area corresponding to the opening part PX_OP. The light emitting layer EML may include an organic material and/or an inorganic material. The light emitting layer EML may generate one of red, green, and blue light.

The electron control layer ECL may be disposed on the light emitting layer EML and the hole control layer HCL. The electron control layer ECL may include an electron transport layer and an electron injection layer. The hole control layer HCL and the electron control layer ECL may be disposed in common in the emission area LA and the non-emission area NLA.

The second electrode CE may be disposed on the electron control layer ECL. The second electrode CE may be commonly disposed on the pixels PX. A portion in which a light emitting element OLED is disposed may be defined as a display element layer DP-OLED.

The thin film encapsulation layer TFE may be disposed on the second electrode CE to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may include an inorganic insulating layer and may protect the pixel PX from moisture/oxygen. The second encapsulation layer EN2 may include an organic insulating layer and may protect the pixel PX from foreign substances such as dust particles.

A first voltage may be applied to the first electrode AE through the transistor TR, and a second voltage having a level lower than the first voltage may be applied to the second electrode CE. The holes and electrons injected into the light emitting layer EML are combined to form excitons, and as the excitons transition to the ground state, the organic light emitting diode OLED may emit light.

An input sensing unit ISP may be disposed on a thin film encapsulation layer TFE. The input sensing unit ISP may be manufactured directly on the upper surface of the thin film encapsulation layer TFE.

A base layer BSL may be disposed on the thin film encapsulation layer TFE. The base layer BSL may include an inorganic insulating layer. At least one inorganic insulating layer may be provided on the thin film encapsulation layer TFE as the base layer BSL.

The input sensing unit ISP may include a first conductive pattern CTL1 and a second conductive pattern CTL2 disposed on the first conductive pattern CTL1. A first conductive pattern CTL1 may be disposed on the base layer BSL. An insulating layer TINS may be disposed on the base layer BSL to cover the first conductive pattern CTL1. The insulating layer TINS may include an inorganic insulating layer or an organic insulating layer. A second conductive pattern CTL2 may be disposed on the insulating layer TINS.

The first and second conductive patterns CTL1 and CTL2 may overlap the non-emission area NLA. Although not shown in the drawing, the first and second conductive patterns CTL1 and CTL2 may be disposed on the non-emission area NLA between the emission areas LA and may have a mesh shape.

The first and second conductive patterns CTL1 and CTL2 may form sensors of the above-described input sensing unit ISP. In an embodiment, for example, the mesh-shaped first and second conductive patterns CTL1 and CTL2 may be separated from each other in a predetermined region to form sensors. A portion of the second conductive pattern CTL2 may be connected to the first conductive pattern CTL1.

An anti-reflection layer RPL may be disposed on the second conductive pattern CTL2. The anti-reflection layer RPL may include a black matrix BM and a plurality of color filters CF. The black matrix BM may overlap the non-emission area NLA, and the color filters CF may overlap the emission areas LA, respectively.

The black matrix BM may be disposed on the insulating layer TINS to cover the second conductive pattern CTL2. An opening part B_OP overlapping an emission area LA and an opening part PX_OP may be defined in the black matrix BM.

The black matrix BM may absorb and block light. The width of the opening part B_OP may be greater than the width of the opening part PX_OP.

The color filters CF may be disposed on the insulating layer TINS and the black matrix BM. The color filters CF may be respectively disposed in the opening parts B_OP. A planarization insulating layer PINS may be disposed on the color filters CF. The planarization insulating layer PINS may provide a flat upper surface.

When external light propagating toward the display panel DP is reflected from the display panel DP and provided to an external user again, like a mirror, the user may see reflected external light. In an embodiment, the anti-reflection layer RPL may include a plurality of color filters CF having a same color as the pixels PX of the display panel DP, for example, to prevent such a reflection of externa light. The color filters CF may filter external light with the same colors as the pixels PX. In such an embodiment, external light may not be recognized by the user.

Figure 8:
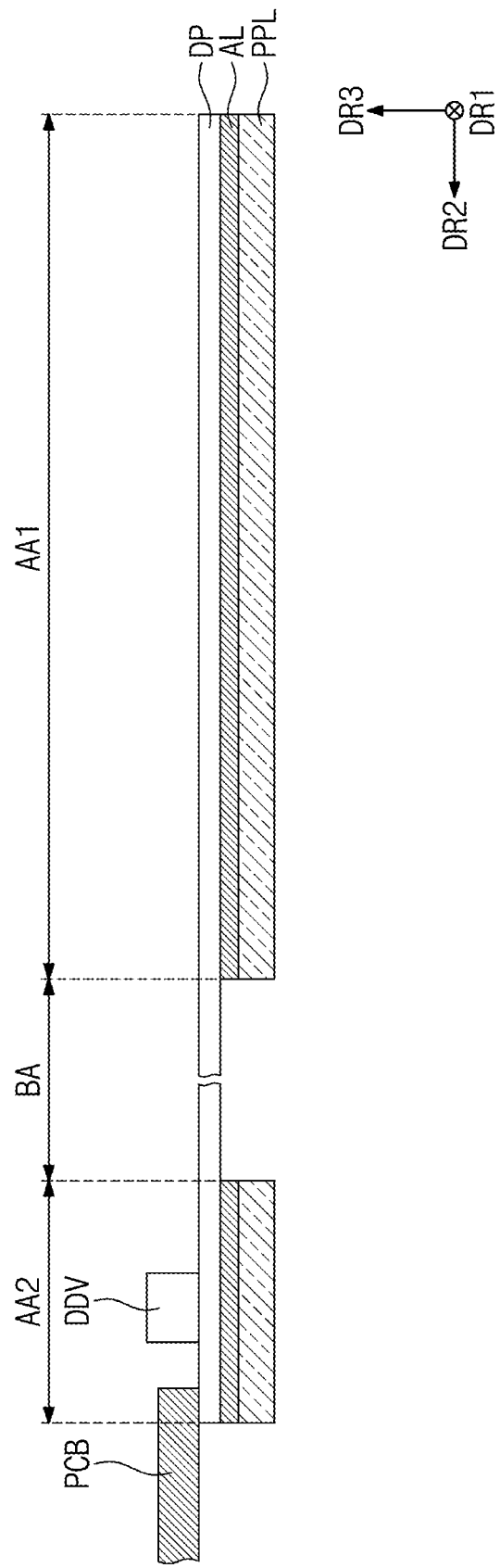
FIG. 8 is a cross-sectional view taken along line I-I' shown in FIG. 6.
Figure 9:
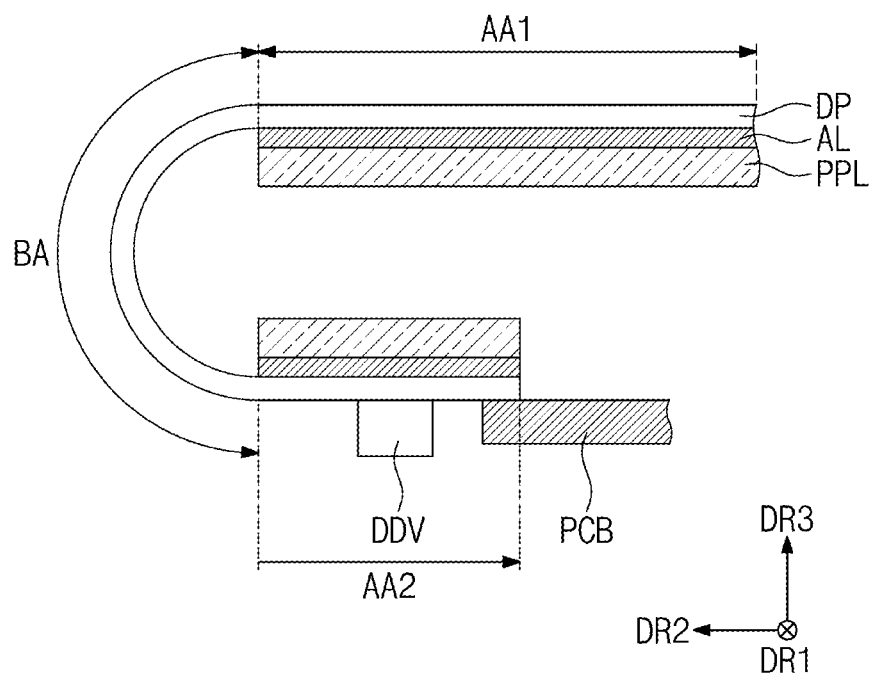
FIG. 9 is a view illustrating a state in which the bending region shown in FIG. 8 is bent.

FIG. 8 is a cross-sectional view taken along line I-I" shown in FIG. 6. FIG. 9 is a diagram illustrating a state in which the bending region shown in FIG. 8 is bent.

Referring to FIGS. 8 and 9, an embodiment of the display module DM may include a panel protective layer PPL disposed under the display panel DP and a printed circuit board PCB connected to one side of the display panel DP.

The panel protective layer PPL may protect the lower portion of the display panel DP. The panel protective layer PPL may include a flexible plastic material. In an embodiment, for example, the panel protective layer PPL may include polyethylene terephthalate (PET).

An adhesive layer AL may be disposed between the panel protective layer PPL and the display panel DP. The panel protective layer PPL and the display panel DP may be bonded to each other by the adhesive layer AL.

The panel protective layer PPL and the adhesive layer AL may not be disposed under the bending area BA. The panel protective layer PPL and the adhesive layer AL may be disposed under the first area AA1 and the second area AA2 of the display panel DP. The data driver DDV may be disposed on the second area AA2 of the display panel DP.

The printed circuit board PCB may be connected to the second area AA2. A printed circuit board PCB may be connected to one side of the second area AA2. The above-described timing controller may be disposed on a printed circuit board PCB.

In an embodiment, as shown in FIG. 9, the bending area BA may be bent in a way such that the second area AA2 may be disposed under the first area AA1 in a bent state. Accordingly, the data driver DDV and the printed circuit board PCB are disposed under the first area AA1 and may not be viewed from the outside.

Figure 10:
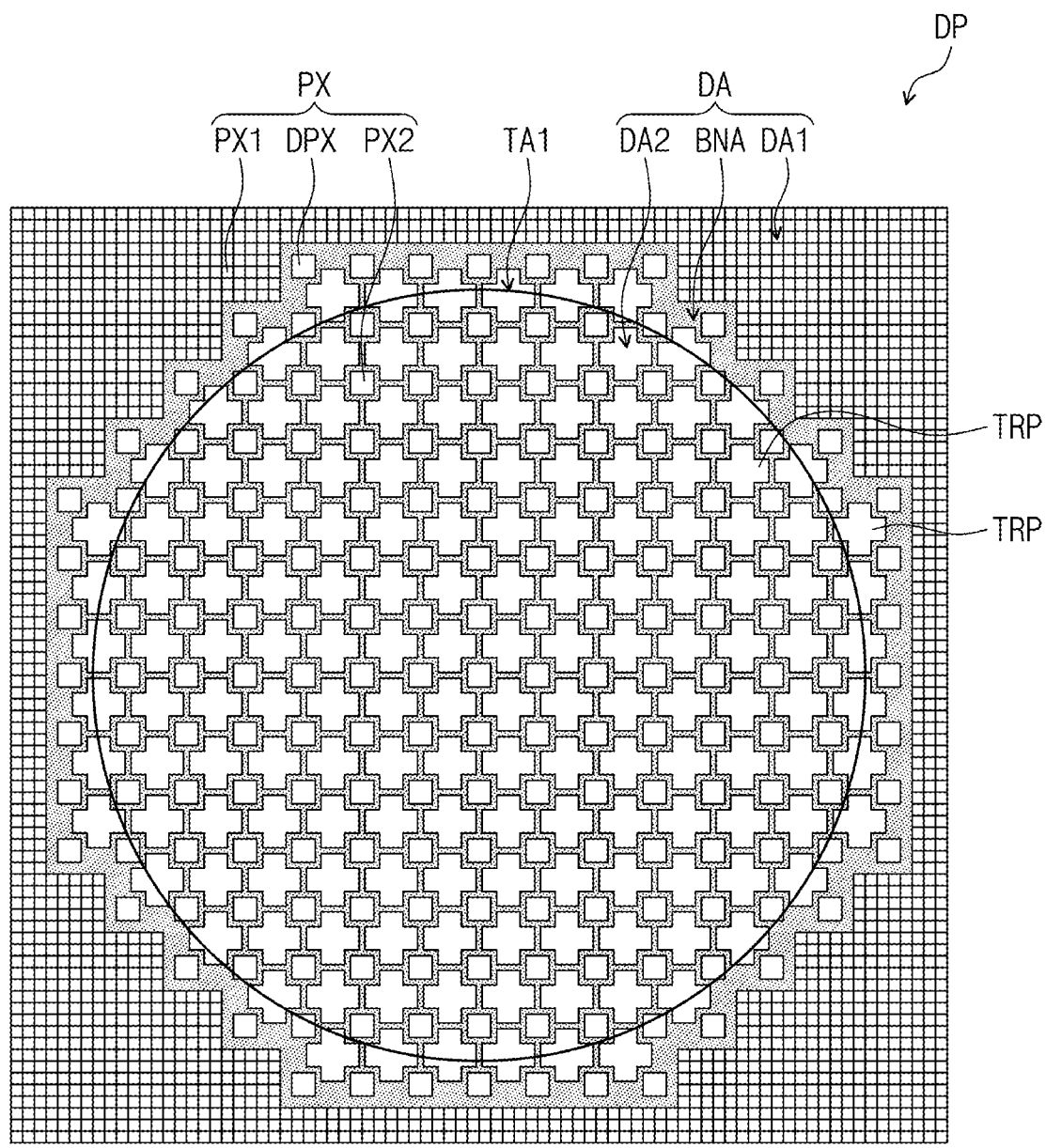
FIG. 10 is an enlarged plan view of a first transmissive area of the display panel shown in FIG. 6.

FIG. 10 is an enlarged plan view of a first transmissive area of the display panel shown in FIG. 6.

In FIG. 10, for convenience of illustration and description, only a planar configuration of the first transmissive area TA1 is illustrated, in such an embodiment, a planar configuration of the second transmissive area TA2 may also be substantially the same as that of the first transmissive area TA1.

Referring to FIG. 10, an embodiment of the display area DA includes a first display area DA1, a second display area DA2, and a boundary area BNA between the first display area DA1 and the second display area DA2.

The second display area DA2 may overlap the first transmissive area TA1. Substantially, the second display area DA2 may be defined by the first transmissive area TA1 and may be defined as the same area as the first transmissive area TA1. The first display area DA1 may surround the second display area DA2. The second display area DA2 may have a higher light transmittance than the first display area DA1.

The pixels PX may include a plurality of first pixels PX1, a plurality of second pixels PX2, and a plurality of dummy pixels DPX. The first pixels PX1 may be disposed in the first display area DA1. The second pixels PX2 may be disposed in the second display area DA2. The dummy pixels DPX may be disposed in the boundary area BNA.

In an embodiment, for example, the boundary area BNA adjacent to the first display area DA1 may have a schematic octagonal shape. However, the shape of the boundary area BNA is not limited thereto.

The first pixels PX1 may be arranged in the first direction DR1 and the second direction DR2 in the first display area DA1. The second pixels PX2 may be arranged in the first direction DR1 and the second direction DR2 in the second display area DA2. However, the arrangement of the first and second pixels PX1 and PX2 is not limited thereto.

The dummy pixels DPX may be disposed to surround the second display area DA2 along the boundary area BNA. Each of the second pixels PX2 and the dummy pixels DPX may include a plurality of sub-pixels for displaying red, green, and blue colors. The first pixels PX1 and the sub-pixels may have a substantially similar structure to each other.

The first display area DA1 may display an image by the first pixels PX1. The second display area DA2 may display an image by the second pixels PX2. The boundary area BNA may display an image by the dummy pixels DPX. Accordingly, a predetermined image may be displayed in the display area DA by the light generated by the first pixels PX1, the second pixels PX2, and the dummy pixels DPX.

The display panel DP may include a plurality of transmission parts TRP disposed or defined in the second display area DA2. The transmission parts TRP may not be disposed in the first display area DA1. The transmission parts TRP may be disposed between the second pixels PX2. The transmission parts TRP may be disposed between the dummy pixels DPX and the second pixels PX2 adjacent to the dummy pixels DPX.

In an embodiment, for example, the transmission parts TRP may have a cross shape, but the shape of the transmission parts TRP is not limited thereto. The transmission parts TRP may be disposed around each of the second pixels PX2. The transmission parts TRP may be disposed in a first diagonal direction DDR1 and a second diagonal direction DDR2 with respect to each of the second pixels PX2.

The first diagonal direction DDR1 may be defined as a direction crossing the first and second directions DR1 and DR2 on a plane defined by the first and second directions DR1 and DR2. The second diagonal direction DDR2 may be defined as a direction crossing the first diagonal direction DDR1 on the plane defined by the first and second directions DR1 and DR2. In an embodiment, for example, the first and second directions DR1 and DR2 may cross each other perpendicularly, and the first and second diagonal directions DDR1 and DDR2 may cross each other perpendicularly.

Pixels PX may not be formed in the transmission parts TRP. Accordingly, the transmission parts TRP may have higher light transmittance than the first and second pixels PX1 and PX2 and the dummy pixels DPX.

The light (the above-described optical signal) transmitted through the transmission parts TRP may be provided to the camera CA disposed under the second display area DA2.

That is, the light transmittance of the first transmissive area TA1 may be improved by the transmission parts TRP, and light may be provided to the camera CA through the first transmissive area TA1. Accordingly, the second display area DA2 may display an image, and the light passing through the second display area DA2 may be provided to the camera CA to capture an image.

Although not shown in the drawing, a portion of the display panel DP overlapping the second transmissive area TA2 may also have substantially the same configuration as the second display area DA2 illustrated in FIG. 10.

Figure 11:
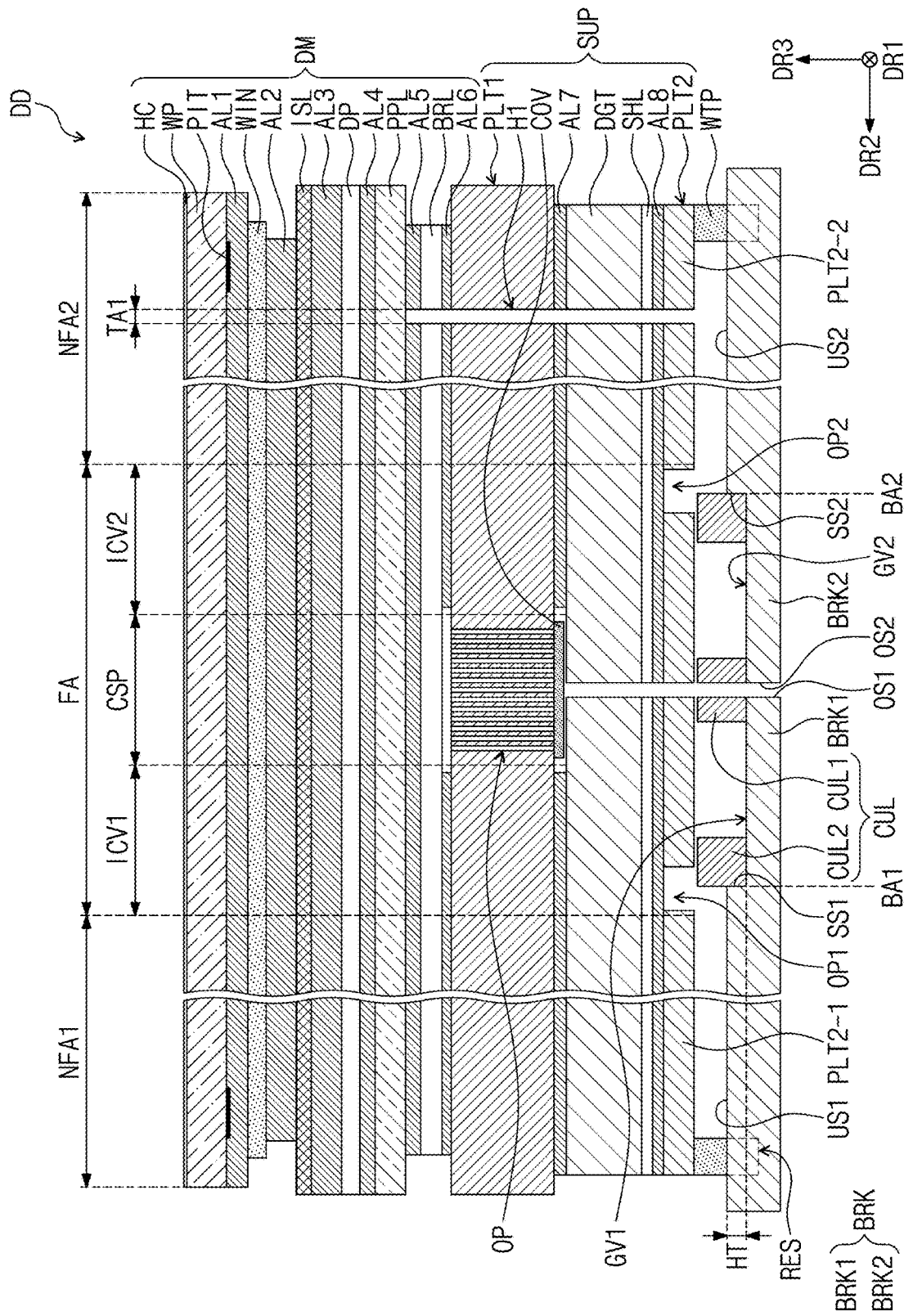
FIG. 11 is a cross-sectional view take along line II-IP shown in FIG. 6.

FIG. 11 is a cross-sectional view of a display device taken along line II-IP shown in FIG. 6.

For convenience of illustration, in FIG. 11, a bracket BRK is shown among the set structures of the display device DD described in FIG. 3.

Referring to FIG. 11, an embodiment of the display device DD may include a display module DM, a support part SUP disposed or placed under the display module DM, a bracket BRK disposed or placed under the support part SUP, a plurality of cushion layers CUL disposed between the support part SUP and the bracket BRK, and a plurality of waterproof tapes WTP disposed between the support part SUP and the bracket BRK.

The display module DM may be a flexible display module. The support part SUP may have greater rigidity than the display module DM, and may support the display module DM under the display module DM.

The display module DM may include a first non-folding area NFA1, a folding area FA, and a second non-folding area NFA2. As the folding area FA is folded around the above-described folding axis FX, the display module DM may be folded.

The folding area FA may include a first inverse curvature part ICV1, a second inverse curvature part ICV2, and a curved part CSP between the first inverse curvature part ICV1 and the second inverse curvature part ICV2. The first inverse curvature part ICV1 may be disposed between the first non-folding area NFA1 and the curved part CSP. The second inverse curvature part ICV2 may be disposed between the second non-folding area NFA2 and the curved part CSP.

When the folding area FA is folded, the curved part CSP may be bent to have a predetermined curvature. The first inverse curvature part ICV1 and the second inverse curvature part ICV2 may be curved opposite to the curved part CSP and may be curved to be symmetrical to each other. The folding area FA in a folded state will be described with reference to FIG. 13 below.

The display module DM may include a window WIN, a window protective layer WP, a hard coating layer HC, a display panel DP, a shock absorption layer ISL, a panel protective layer PPL, a barrier layer BRL, and first to sixth adhesive layers AL1 to AL6. Since the configuration of the display panel DP and the panel protective layer PPL has been described in detail with reference to FIG. 8, any repetitive detailed description thereof will be omitted.

The shock absorption layer ISL may be disposed on the display panel DP. The shock absorption layer ISL may absorb an external shock applied from the top of the display device DD toward the display panel DP to protect the display panel DP. The shock absorption layer ISL may be in the form of a stretched film.

The shock absorption layer ISL may include a flexible plastic material. A flexible plastic material may be defined as a synthetic resin film. In an embodiment, for example, the shock absorption layer ISL may include a flexible plastic material such as PI or PET.

The window WIN may be disposed on a shock absorption layer ISL. The window WIN may protect the display panel DP from external scratches. The window WIN may have an optically transparent property. In an embodiment, the window WIN may include glass. However, the embodiment of the invention is not limited thereto, and alternatively, the window WIN may include a synthetic resin film.

The window WIN may have a multi-layer structure or a single-layer structure. In an embodiment, for example, the window WIN may include a plurality of synthetic resin films bonded with an adhesive, or a glass substrate and a synthetic resin film bonded with an adhesive.

The window protective layer WP may be disposed on the window WIN. The window protective layer WP may include a flexible plastic material such as PI or PET. The hard coating layer HC may be disposed on the upper surface of the window protective layer WP.

The printed layer PIT may be disposed on the lower surface of the window protective layer WP. The printed layer PIT may have a black color, but the color of the printed layer PIT is not limited thereto. The printed layer PIT may be adjacent to the edge of the window protective layer WP.

The barrier layer BRL may be disposed under the panel protective layer PPL. The barrier layer BRL may increase resistance to a compressive force due to external pressing. Accordingly, the barrier layer BRL may prevent deformation of the display panel DP. The barrier layer BRL may include a flexible plastic material such as PI or PET.

The barrier layer BRL may have a color that absorbs light. In an embodiment, for example, the barrier layer BRL may have a black color. In this case, when the display module DM is viewed from above the display module DM, components disposed under the barrier layer BRL may not be viewed.

The first adhesive layer AL1 may be disposed between the window protective layer WP and the window WIN. The window protective layer WP and the window WIN may be bonded to each other by the first adhesive layer ALL The first adhesive layer AL1 may cover the printed layer PIT.

The second adhesive layer AL2 may be disposed between the window WIN and the shock absorption layer ISL. The window WIN and the shock absorption layer ISL may be bonded to each other by the second adhesive layer AL2.

The third adhesive layer AL3 may be disposed between the shock absorption layer ISL and the display panel DP. The shock absorption layer ISL and the display panel DP may be bonded to each other by the third adhesive layer AL3.

The fourth adhesive layer AL4 may be disposed between the display panel DP and the panel protective layer PPL. The display panel DP and the panel protective layer PPL may be bonded to each other by the fourth adhesive layer AL4. The fourth adhesive layer AL4 may correspond to the adhesive layer AL shown in FIG. 8.

The adhesive layer AL may be disposed between the panel protective layer PPL and the display panel DP. The panel protective layer PPL and the barrier layer BRL may be bonded to each other by the fifth adhesive layer AL5.

The sixth adhesive layer AL6 may be disposed between the barrier layer BRL and the support part SUP. The barrier layer BRL and the support part SUP may be bonded to each other by the sixth adhesive layer AL6. The barrier layer BRL may be bonded to the first support plate PLT1 of the support part SUP by the sixth adhesive layer AL6.

The sixth adhesive layer AL6 may overlap the first and second non-folding areas NFA1 and NFA2 and may not overlap the curved part CSP of the folding area FA. That is, the sixth adhesive layer AL6 may not be disposed on the curved part CSP.

The first to sixth adhesive layers AL1 to AL6 may include a transparent adhesive such as a pressure sensitive adhesive (PSA) or an optically clear adhesive (OCA), and the type of adhesive is not limited thereto.

Herein, "thickness" may represent a value or length measured in the third direction DR3, and "width" may represent a value or length measured in the first direction DR1 or the second direction DR2, which is a horizontal direction.

A thickness of the panel protective layer PPL may be less than a thickness of the window protective layer WP, and a thickness of the barrier layer BRL may be less than the thickness of the panel protective layer PPL. A thickness of the display panel DP may be less than the thickness of the barrier layer BRL and may be the same as a thickness of the window WIN. A thickness of the shock absorption layer ISL may be less than the thickness of the display panel DP.

A thickness of the first adhesive layer AL1 is the same as the thickness of the barrier layer BRL, and each of the second adhesive layer AL2 and the third adhesive layer AL3 may have a same thickness as the panel protective layer PPL. A thickness of the fourth adhesive layer AL4 may be the same as a thickness of the fifth adhesive layer AL5.

Each of the fourth and fifth adhesive layers AL4 and AL5 may have a thickness less than the thickness of the display panel DP and greater than the thickness of the shock absorption layer ISL. The sixth adhesive layer AL6 may be less than the thickness of the shock absorption layer ISL. The thickness of the hard coating layer HC may be less than the thickness of the sixth adhesive layer AL6.

The display panel DP, the shock absorption layer ISL, the panel protective layer PPL, and the third and fourth adhesive layers AL3 and AL4 may have a same width as each other. The window protective layer WP and the first adhesive layer AL1 may have a same width as each other. The barrier layer BRL and the fifth and sixth adhesive layers AL5 and AL6 may have a same width as each other.

Widths of the display panel DP, the shock absorption layer ISL, the panel protective layer PPL, and the third and fourth adhesive layers AL3 and AL4 may be greater than widths of the window protective layer WP and the first adhesive layer AL1. Edges of the display panel DP, the shock absorption layer ISL, the panel protective layer PPL, and the third and fourth adhesive layers AL3 and AL4 may be disposed outside the edges of the window protective layer WP and the first adhesive layer AL1.

Widths of the window WIN and the second adhesive layer AL2 may be less than widths of the window protective layer WP and the first adhesive layer AL1. The width of the second adhesive layer AL2 may be less than the width of the window WIN. The edge of the window WIN may be disposed inside the edge of the window protective layer WP and the first adhesive layer AL1. The edge of the second adhesive layer AL2 may be disposed inside the edge of the window WIN.

Widths of the barrier layer BRL and the fifth and sixth adhesive layers AL5 and AL6 may be less than widths of the window protective layer WP and the first adhesive layer AL1. Edges of the barrier layer BRL and the fifth and sixth adhesive layers AL5 and AL6 may be disposed inside the window protective layer WP and edges of the first adhesive layer AL'.

The support part SUP may include a first support plate PLT1, a second support plate PLT2, a cover layer COV, a digitizer DGT, a shielding layer SHL, and seventh and eighth adhesive layers AL7 and ALB.

The first support plate PLT1 may be disposed under the display panel DP to support the display panel DP. The first support plate PLT1 may include a non-metal material. In an embodiment, for example, the first support plate PLT1 may include a reinforcing fiber composite. The reinforcing fiber composite may be carbon fiber reinforced plastic (CFRP) or glass fiber reinforced plastic (GFRP).

The first support plate PLT1 may include a reinforcing fiber composite material to be lightweight. In an embodiment, the first support plate PLT1 may have a modulus and strength similar to those of a metal support plate including a metal material by including a reinforcing fiber composite while having a light weight compared to the metal support plate.

Since the first support plate PLT1 includes a reinforcing fiber composite, it may be easy to shape the first support plate PLT1 compared to the metal support plate. In an embodiment, for example, the first support plate PLT1 including the reinforcing fiber composite may be more easily processed through a laser process or a micro blast process.

A plurality of opening parts OP may be defined in a portion of the first support plate PLT1 overlapping the folding area FA when viewed in a plan view (in the third direction DR3). When viewed in a plan view, the opening parts OP may overlap the curved part CSP. The opening parts OP may be formed by penetrating or removing portions of the first support plate PLT1 in the third direction DR3. The opening parts OP may be formed through the above-described laser process or micro blast process.

In such an embodiment where the opening parts OP are defined on the part of the first support plate PLT1 overlapping the curved part CSP, the flexibility of the portion of the first support plate PLT1 overlapping the curved part CSP may be increased. As a result, the first support plate PLT1 may be easily folded around the folding area FA.

The cover layer COV may be disposed under the first support plate PLT1. The cover layer COV may cover the opening parts OP defined in the first support plate PLT1 under the first support plate PLT1. When viewed in a plan view, the cover layer COV may overlap the folding area FA and may not overlap the first and second non-folding areas NFA1 and NFA2. The cover layer COV may contact the lower surface of the portion of the first support plate PLT1 on which the opening parts OP are formed.

The cover layer COV may have a lower elastic modulus than the first support plate PLT1. In an embodiment, for example, the cover layer COV may include thermoplastic polyurethane or rubber, but the material of the cover layer COV is not limited thereto. The cover layer COV may be manufactured in the form of a sheet and attached to the first support plate PLT1.

The digitizer DGT may be disposed under the first support plate PLT1. The cover layer COV may be disposed between the first support plate PLT1 and the digitizer DGT. The cover layer COV may be spaced apart from the upper surface of the digitizer DGT.

The digitizer DGT is a device that may receive location information instructed by a user on a display surface. The digitizer DGT may be implemented using an electromagnetic method (or an electromagnetic resonance method). In an embodiment, for example, the digitizer DGT may include a digitizer sensor substrate (not shown) including a plurality of coils. However, the embodiment of the invention is not limited thereto, and the digitizer DGT may be implemented as an active electrostatic type.

When the user moves a pen on the display device DD, the pen is driven by an alternating current signal to generate an oscillating magnetic field, which may induce a signal in the coil. The position of the pen may be detected through the signal induced in the coil. The digitizer DGT may detect the position of the pen by detecting an electromagnetic change generated by the approach of the pen.

In a case where the first support plate PLT1 disposed on the digitizer DGT and adjacent to the digitizer DGT includes metal, the sensitivity of the digitizer DGT may be lowered by the metal. In this case, for example, when a signal transmitted on the display device DD is blocked due to signal interference by a metal support plate, the digitizer DGT may not operate normally. However, in an embodiment of the invention, the first support plate PLT1 disposed on the digitizer DGT includes a non-metal reinforcing fiber composite, such that the digitizer DGT may operate normally.

The digitizer DGT may be divided into two parts under the folding area FA. Although not shown, parts of the digitizer DGT separated from each other may be connected to a digitizer driver (not shown) through a flexible circuit board.

The shielding layer SHL may be disposed under the digitizer DGT. The digitizer DGT may be disposed between the first support plate PLT1 and the shielding layer SHL. The shielding layer SHL may include a metal. In an embodiment, for example, the shielding layer SHL may include copper, but the metal material of the shielding layer SHL is not limited thereto. The shielding layer SHL may be separated in two parts under the folding area FA. The parts of the shielding layer SHL that are separated from each other may be respectively disposed under the parts of the digitizer DGT that are separated from each other.

The shielding layer SHL may shield electromagnetic waves that may be applied to the digitizer DGT under the display device DD. The shielding layer SHL may be defined as an electromagnetic shielding layer. A shielding layer SHL including a metal may serve as a heat dissipation layer.

The second support plate PLT2 may be disposed under the shielding layer SHL. The shielding layer SHL and the digitizer DGT may be disposed between the first support plate PLT1 and the second support plate PLT2.

The second support plate PLT2 may include a metal material such as stainless steel (e.g., SUS 316), but the metal material of the second support plate PLT2 is not limited thereto. Alternatively, and the second support plate PLT2 may include a non-metallic material such as plastic.

The second support plate PLT2 may be separated into two parts in the folding area FA. When viewed in a plan view, the second support plate PLT2 may include a first second support plate PLT2-1 overlapping the first non-folding area NFA1 and a second second support plate PLT2-2 overlapping the second non-folding area NFA2. The first second support plate PLT2-1 and the second second support plate PLT2-2 may be spaced apart from each other in a horizontal direction (e.g., the second direction DR2).

The first second support plate PLT2-1 may support the first non-folding area NFA1. The second second support plate PLT2-2 may support the second non-folding area NFA2. The first second support plate PLT2-1 and the second second support plate PLT2-2 extend under the folding area FA and may be spaced apart from each other. In an embodiment, the first second support plate PLT2-1 and the second second support plate PLT2-2 may extend under the curved part CSP to be spaced apart from each other.

The first second support plate PLT2-1 and the second second support plate PLT2-2 may support a portion of the first support plate PLT1 in which opening parts OP are defined under the folding area FA. When pressure is applied to the first support plate PLT1 from the top, by the first second support plate PLT2-1 and the second second support plate PLT2-2, deformation of the portion of the first support plate PLT1 in which the opening parts OP are defined may be prevented. In an embodiment, the first and second support plates PLT2-1 and PLT2-2 may perform a heat dissipation function.

The seventh adhesive layer AL7 may be disposed between the first support plate PLT1 and the digitizer DGT. The first support plate PLT1 and the digitizer DGT may be bonded to each other by the seventh adhesive layer AL7.

The seventh adhesive layer AL7 may be opened at a portion overlapping the curved part CSP not to be disposed under the curved part CSP. The above-described cover layer COV may be disposed on an opening part of the seventh adhesive layer AL7.

The eighth adhesive layer AL8 may be disposed between the shielding layer SHL and the second support plate PLT2. The shielding layer SHL and the second support plate PLT2 may be bonded to each other by the eighth adhesive layer AL8. The eighth adhesive layer AL8 may be separated from each other under the folding area FA. The parts of the eighth adhesive layer AL8 separated from each other may be disposed between portions of the shielding layer SHL separated from each other and the second first second and second second support plates PLT2-1 and PLT2-2, respectively.

The width of the first support plate PLT1 may be substantially the same as the width of the display panel DP. The widths of the digitizer DGT and the seventh adhesive layer AL7 may be less than the widths of the first support plate PLT1. The edges of the digitizer DGT and the seventh adhesive layer AL7 may be disposed inside the edges of the first support plate PLT1.

Widths of the shielding layer SHL, the eighth adhesive layer AL8, and the second support plate PLT2 may be less than the widths of the digitizer DGT. Edges of the shielding layer SHL, the eighth adhesive layer AL8, and the second support plate PLT2 may be disposed inside the edges of the digitizer DGT.

The thickness of the first support plate PLT1 may be greater than the thickness of the digitizer DGT, and the thickness of the digitizer DGT may be greater than the thickness of the second support plate PLT2. The thickness of the second support plate PLT2 may be greater than the thickness of each of the seventh and eighth adhesive layers AL7 and AL8.

The thickness of each of the seventh and eighth adhesive layers AL7 and AL8 may be greater than the thickness of the shielding layer SHL, and the thickness of the shielding layer SHL may be greater than the thickness of the cover layer COV. The thickness of the cover layer COV may be the same as the thickness of the sixth adhesive layer AL6.

The seventh and eighth adhesive layers AL7 and AL8 may include a PSA or an OCA, but the type of adhesive is not limited thereto.

A first hole H1 may be defined in a portion of the display module DM overlapping the first transmissive area TA1. The first hole H1 may be defined from the second support plate PLT2 to the panel protective layer PPL. In an embodiment, for example, the first hole H1 may be integrally defined in the barrier layer BRL, the first support plate PLT1, the digitizer DGT, the shielding layer SHL, the second support plate PLT2, and the fifth to eighth adhesive layers AL5 to AL8. The first hole H1 may be defined in the second second support plate PLT2-2.

In the portion overlapping the first transmissive area TA1, since the barrier layer BRL, the first support plate PLT1, the digitizer DGT, the shielding layer SHL, the second support plate PLT2, and the fifth to eighth adhesive layers AL5 to AL8 are removed, the light transmittance of the first transmissive area TA1 may be improved.

Although not shown in the drawing, a second hole is defined in the second transmissive area TA2, and the second hole may be defined from the second support plate PLT2 to the panel protective layer PPL in the same way as the first hole H1. The above-described camera CA may be disposed in the first hole H1, and the above-described sensor SN may be disposed in the second hole.

The bracket BRK, the cushion layers CUL, and the waterproof tapes WTP may be disposed under the second support plate PLT2. The bracket BRK may include a first bracket BRK1 disposed under the first second support plate PLT2-1 and a second bracket BRK2 disposed under the second second support plate PLT2-2. The first bracket BRK1 and the second bracket BRK2 may be respectively disposed under portions of the digitizer DGT that are separated from each other. The first bracket BRK1 and the second bracket BRK2 may be spaced apart from each other in a horizontal direction (e.g., the second direction DR2).

The first second support plate PLT2-1 may be disposed between the first support plate PLT1 and the first bracket BRK1. The second second support plate PLT2-2 may be disposed between the first support plate PLT1 and the second bracket BRK2. In a plan view, the first bracket BRK1 may overlap the first non-folding area NFA1, and the second bracket BRK2 may overlap the second non-folding area NFA2.

A first groove GV1 may be defined on an upper surface of a portion of the first bracket BRK1 facing the first second support plate PLT2-1. A second groove GV2 may be defined on an upper surface of a portion of the second bracket BRK2 facing the second second support plate PLT2-2.

The first groove GV1 may be defined on an upper surface of a portion of the first bracket BRK1 adjacent to the second bracket BRK2. The first groove GV1 may be defined from one side OS1 of the first bracket BRK1 facing the second bracket BRK2.

The second groove GV2 may be defined on an upper surface of a portion of the second bracket BRK2 adjacent to the first bracket BRK1. The second groove GV2 may be defined from one side OS2 of the second bracket BRK2 facing the first bracket BRK1.

The cushion layers CUL may be disposed between the first second and second second support plates PLT2-1 and PLT2-2 and the first and second brackets BRK1 and BRK2. The cushion layers CUL may be disposed in the first and second grooves GV1 and GV2.

The cushion layer CUL may absorb an external shock applied to the lower part of the display module DM. The cushion layer CUL may include a foam sheet having a predetermined elastic force. The cushion layer CUL may include foam, sponge, polyurethane, or thermoplastic polyurethane.

The cushion layers CUL may include a plurality of first cushion layers CUL1 and a plurality of second cushion layers CUL2. The first cushion layers CUL1 may be disposed adjacent to one side OS1 of the first bracket BRK1 and one side OS2 of the second bracket BRK2 facing each other.

A boundary between the upper surface US1 of the first bracket BRK1 in which the first groove GV1 is not defined and the first groove GV1 may be defined as the first boundary BA1. A boundary between the upper surface US2 of the second bracket BRK2 in which the second groove GV2 is not defined and the second groove GV2 may be defined as the second boundary BA2. Based on the third direction DR3, a height difference HT between each of the first and second grooves GV1 and GV2 and each of the upper surfaces US1 and US2 may be set to about 0.2 millimeter (mm) to about 0.7 mm. In an embodiment, for example, the height difference HT may be set to about 0.35 mm.

The second cushion layers CUL2 may be spaced apart from the first cushion layers CUL1 and disposed adjacent to the first and second boundaries BA1 and BA2. The second cushion layers CUL2 may be disposed to contact the first side surface SS1 of the first bracket BRK1 at the first boundary BA1 and the second side surface SS2 of the second bracket BRK2 at the second boundary BA2. In an embodiment, the first boundary BA1 may be defined with respect to the first side surface SS1 of the first bracket BRK1 and the second boundary BA2 may be defined with respect to the second side surface SS2 of the second bracket BRK2. When viewed in a plan view, a first opening part OP1 may be defined in a portion of the first second support plate PLT2-1 overlapping the first boundary BA1. When viewed in a plan view, a second opening part OP2 may be defined in a portion of the second second support plate PLT2-2 overlapping the second boundary BA2. In an embodiment, the first opening part OP1 and the second opening part OP2 may also be defined in the eighth adhesive layer AL8.

When viewed in a plan view, the first opening part OP1 may overlap the first inverse curvature part ICV1, and the second opening part OP2 may overlap the second inverse curvature part ICV2. When viewed in a plan view, the first opening part OP1 may overlap a portion of the first inverse curvature part ICV1 adjacent to the first non-folding area NFA1, and the second opening part OP2 may overlap a portion of the second inverse curvature part ICV2 adjacent to the second non-folding area NFA2.

The first and second cushion layers CUL1 and CUL2 may be attached to the first and second brackets BRK1 and BRK2, and may not be attached to the first second and second second support plates PLT2-1 and PLT2-2. However, the embodiment of the invention is not limited thereto, and alternatively, the first and second cushion layers CUL1 and CUL2 may not be attached to the first and second brackets BRK1 and BRK2, and may be attached to the first second and second second support plates PLT2-1 and PLT2-2.

The waterproof tapes WTP may be disposed between the first second and second second support plates PLT2-1 and PLT2-2 and the first and second brackets BRK1 and BRK2. The waterproof tapes WTP may be attached to the first second and second second support plates PLT2-1 and PLT2-2 and the first and second brackets BRK1 and BRK2.

The waterproof tapes WTP may be disposed adjacent to the edges of the first and second brackets BRK1 and BRK2. Edges of the first and second brackets BRK1 and BRK2 may face the outside of the display device DD. In an embodiment, for example, the edges of the first and second brackets BRK1 and BRK2 are disposed toward the outside of the display device DD, so that the edges of the first and second brackets BRK1 and BRK2 may be defined as side surfaces of the first and second brackets BRK1 and BRK2 that do not face each other.

The lower portions of the waterproof tapes WTP may be disposed or inserted in recesses RES defined in portions of upper surfaces of the first and second brackets BRK1 and BRK2. Therefore, the waterproof tapes WTP may be more firmly fixed to the first and second brackets BRK1 and BRK2.

Although not shown in the drawing, when the bending area BA shown in FIG. 9 is bent, the second area AA2 may be disposed under the second support plate PLT2, and an additional waterproof tape WTP may be attached to the lower surface of the second area AA2.

Figure 12:
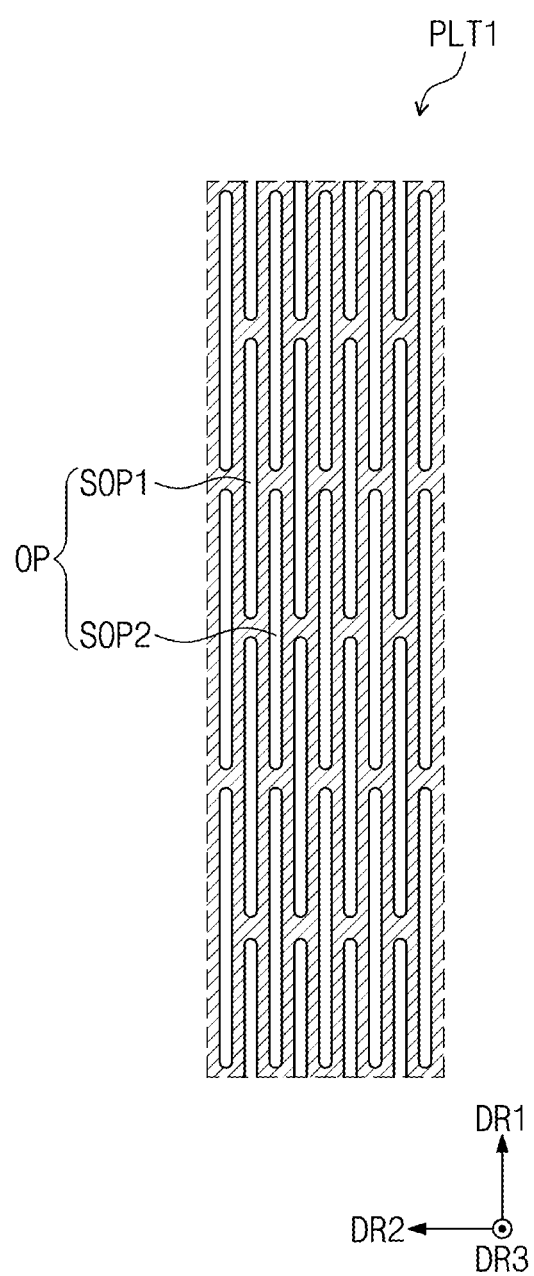
FIG. 12 is a plan view of a portion of the first support plate overlapping the curved part shown in FIG. 11.

FIG. 12 is a plan view of a portion of the first support plate overlapping the curved part shown in FIG. 11.

Referring to FIG. 12, the opening parts OP may be arranged in a first direction DR1 and a second direction DR2. The opening parts OP may extend longer in the first direction DR1 than in the second direction DR2. That is, the opening parts OP may extend in a direction parallel to the aforementioned folding axis FX.

The opening parts OP may include a plurality of first sub-opening parts SOP1 arranged in the first direction DR1 and a plurality of second sub-opening parts SOP2 arranged in the first direction DR1 adjacent to the first sub-opening parts SOP1 in the second direction DR2. The first sub-opening parts SOP1 may be disposed alternately with the second sub-opening parts SOP2.

Figure 13:
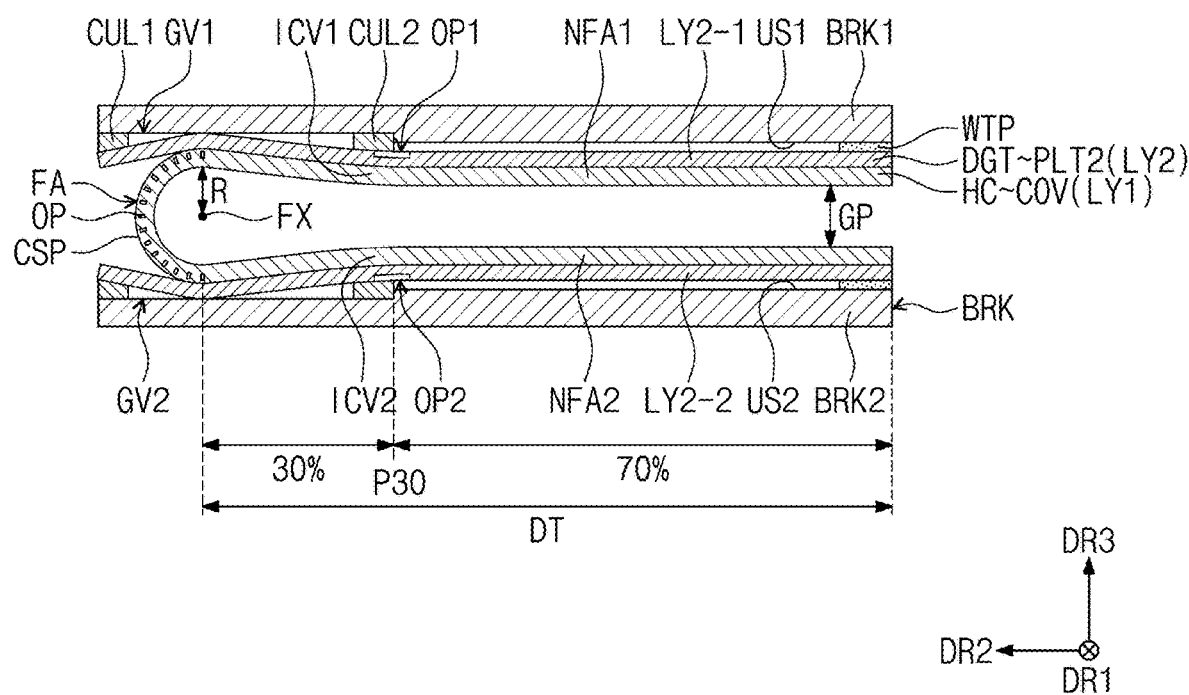
FIG. 13 is a view illustrating of the display device shown in FIG. 11 in a folded state.

FIG. 13 is a view illustrating the display device shown in FIG. 11 in a folded state.

For convenience of illustration, in FIG. 13, a layer from the hard coating layer HC to the cover layer COV is illustrated as a single layer (hereinafter, will be referred to as a first layer LY1), and a layer from the digitizer DGT to the second support plate PLT2 is illustrated as a single layer (hereinafter, will be referred to as a second layer LY2).

Referring to FIGS. 11 and 13, an embodiment of the display device DD may be in-folded around the folding axis FX. The folding area FA is bent in a way such that the first non-folding area NFA1 and the second non-folding area NFA2 may face each other. The display device DD may change from the flat first state illustrated in FIG. 11 to the folded second state illustrated in FIG. 13, or may change from the second state to the first state. This folding operation may be repeatedly performed.

During the folding operation of the display device DD, by the opening parts OP defined in the first support plate PLT1, a portion of the first support plate PLT1 overlapping the folding area FA may be easily bent.

During the folding operation of the display device DD, the curved part CSP may be bent to have a predetermined radius of curvature R about the folding axis FX. The first inverse curvature part ICV1 may be curved opposite to the curved part CSP. The second inverse curvature part ICV2 may be curved opposite to the curved part CSP. The first inverse curvature part ICV1 and the second inverse curvature part ICV2 may be bent to be symmetrical to each other.

According to an embodiment, as shown in FIG. 3, the first layer LY1 may be folded into a dumbbell shape. Accordingly, a distance between the first non-folding area NFA1 and the second non-folding area NFA2 may be less than a diameter of a circle having a radius of curvature R.

The second layer LY2 may include a first second layer LY2-1 and a second second layer LY2-2 separated under the folding area FA. The first second layer LY2-1 may be convexly curved upward in a space between the first cushion layer CUL1 and the second cushion layer CUL2 disposed in the first groove GV1. The first second layer LY2-1 may be convexly curved downward on the first inverse curvature part ICV1 adjacent to the first non-folding area NFA1.

The first second layer LY2-1 may be more easily bent upwards convexly by the space defined between the first cushion layer CUL1 and the second cushion layer CUL2 in the first groove GV1. In such an embodiment where the first opening part OP1 is defined in the first second layer LY2-1, the first second layer LY2-1 may be more easily bent downwardly and convexly on the first inverse curvature part ICV1.

The second layer LY2-2 may be convexly bent downward in a space between the first cushion layer CUL1 and the second cushion layer CUL2 disposed in the second groove GV2. The second second layer LY2-2 may be convexly curved upwardly under the second inverse curvature part ICV2 adjacent to the second non-folding area NFA2.

The second second layer LY2-2 may be more easily bent convexly downward by the space defined between the first cushion layer CUL1 and the second cushion layer CUL2 in the second groove GV2. In such an embodiment where the second opening part OP2 is defined in the 2nd-2nd layer LY2-2, the second second layer LY2-2 may be more easily curved upwardly and convexly on the second inverse curvature part ICV2.

The first second layer LY2-1 and the second second layer LY2-2 may extend flat along upper surfaces US1 and US2 of the first and second brackets BRK1 and BRK2 in which the first and second grooves GV1 and GV2 are not formed The second layer LY2 may guide the folding state of the first layer LY1. As the second layer LY2 is bent to have the above-described shape, the first layer LY1 may be more easily bent to have a dumbbell shape along the second layer LY2. When the first layer LY1 is folded in a dumbbell shape, a distance between the first and second non-folding areas NFA1 and NFA2 may be smaller. Accordingly, in an embodiment of the invention, the display module DM may be more easily folded into a dumbbell shape.

The radius of curvature R may be set to about 1.5 mm. An interval GP between the first and second non-folding areas NFA1 and NFA2 may be less than about 2 mm. In an embodiment, for example, the interval GP between the first and second non-folding areas NFA1 and NFA2 may be set to about 1.5 mm.

The distance DT from the boundary between the curved part CSP and the first and second inverse curvature parts ICV1 and ICV2 to the ends of the first and second non-folding areas NFA1 and NFA2 may be defined as a distance measured in the second direction DR2. The centers of the first and second opening parts OP1 and OP2 may be disposed at a point P30 of about 30% of the distance DT from the boundary between the curved part CSP and the first and second inverse curvature parts ICV1 and ICV2.

Figure 14:
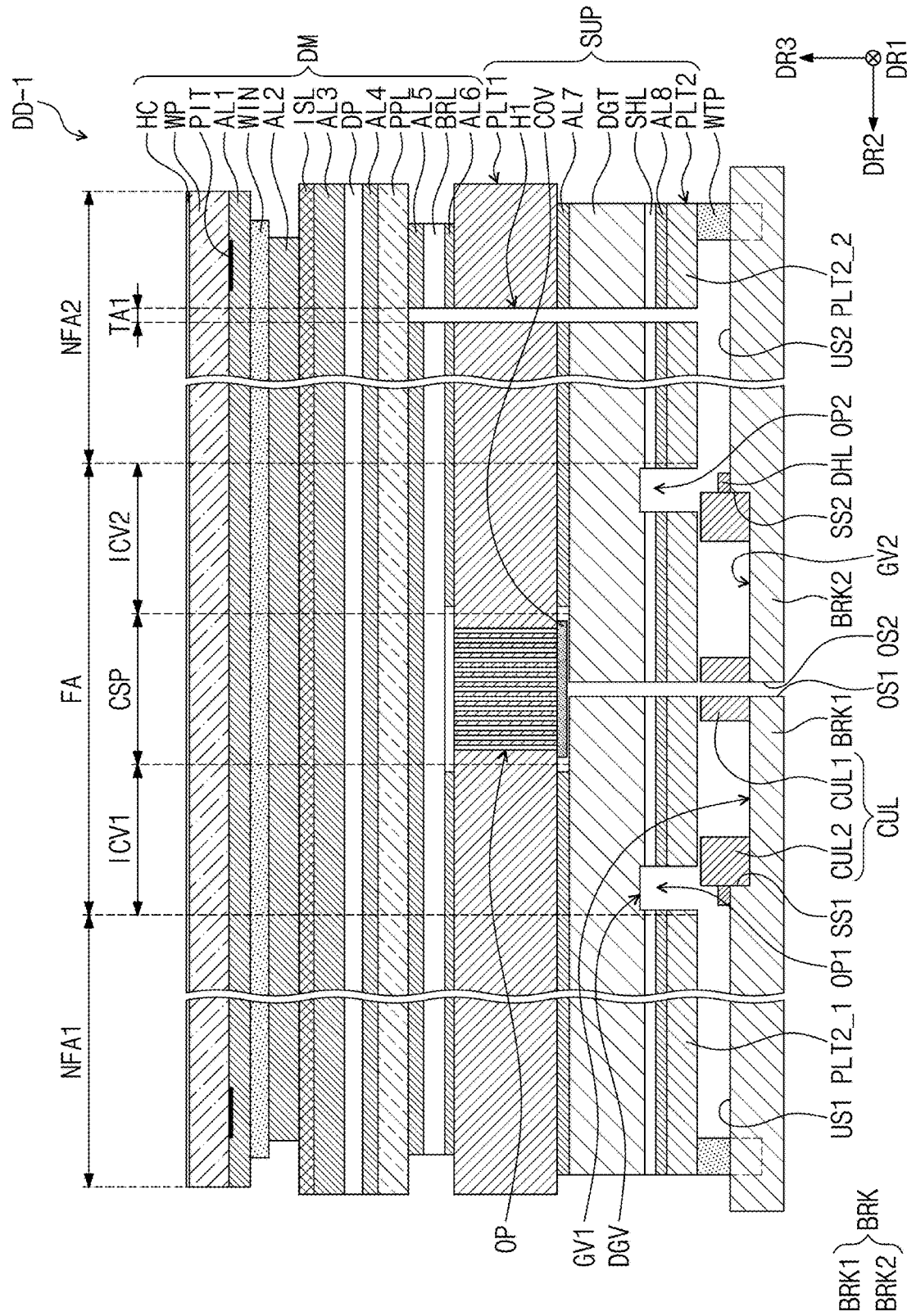
FIG. 14 is a diagram showing the configuration of a display device according to an alternative embodiment of the invention.
Figure 15:
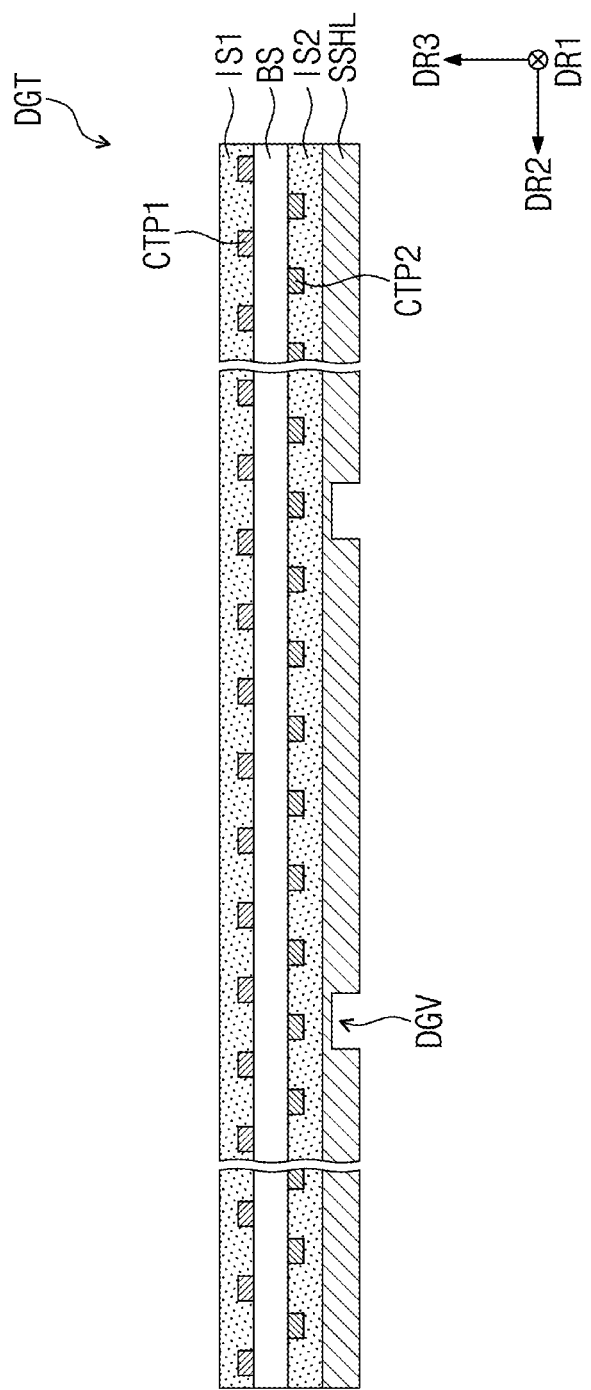
FIG. 15 is a cross-sectional view of the digitizer shown in FIG. 14.

FIG. 14 is a diagram showing the configuration of a display device according to an alternative embodiment of the invention. FIG. 15 is a cross-sectional view of the digitizer shown in FIG. 14.

Particularly, FIG. 14 is a cross-sectional view corresponding to FIG. 11.

Hereinafter, the configuration of the display device DD-1 shown in FIG. 14 will be described, focusing on a configuration different from the display device DD shown in FIG. 11.

Referring to FIG. 14, the first opening part OP1 and the second opening part OP2 may be defined in the second support plate PLT2 and the eighth adhesive layer ALB. In addition, the first opening part OP1 and the second opening part OP2 may be further defined in the shielding layer SHL.

Dummy grooves DGV overlapping the first and second opening parts OP1 and OP2 may be defined on a lower surface of the digitizer DGT. The above-described second layer LY2 may be more easily bent than in the first and second inverse curvature parts ICV1 and ICV2 by the first and second opening parts OP1 and OP2 and the dummy grooves DGV.

Referring to FIG. 15, the digitizer DGT may include a base layer BS, a first conductive pattern CTP1, a second conductive pattern CTP2, a first insulating layer IS1, a second insulating layer IS2, and a sub-shielding layer SSHL. The first conductive pattern CTP1 may be disposed on the base layer BS, and the second conductive pattern CTP2 may be disposed under the base layer BS. The first insulating layer IS1 may be disposed on the base layer BS to cover the first conductive pattern CTP1, and the second insulating layer IS2 may be disposed under the base layer BS to cover the second conductive pattern CTP2.

The sub-shielding layer SSHL may be disposed under the second conductive pattern CTP2. The sub-shielding layer SSHL may be disposed on the lower surface of the second insulating layer IS2. The sub-shielding layer SSHL may include a metal material. Like the shielding layer SHL, the sub-shielding layer SSHL may shield electromagnetic waves that may be applied to the digitizer DGT under the display device DD. The dummy grooves DGV shown in FIG. 14 may be defined on a lower surface of the sub-shielding layer SSHL in FIG. 15.

Referring to FIGS. 14 and 15, since parts of the sub-shielding layer SSHL have been removed, an additional configuration may be included instead of the removed portions of the sub-shielding layer SSHL. In an embodiment, as shown in FIG. 14, the display device DD-1 may further include a plurality of dummy shielding layers DHL that include or are formed of a same material as the sub-shielding layer SSHL and perform a same function as the sub-shielding layer SSHL.

The dummy shielding layers DHL may be disposed on upper surfaces US1 and US2 of portions of the first and second brackets BRK1 and BRK2 adjacent to the first and second grooves GV1 and GV2. The dummy shielding layers DHL may contact side surfaces of the second cushion layers CUL2. The dummy shielding layers DHL may overlap the dummy grooves DGV when viewed in a plan view. Dummy shielding layers DHL may be omitted.

Figure 16:
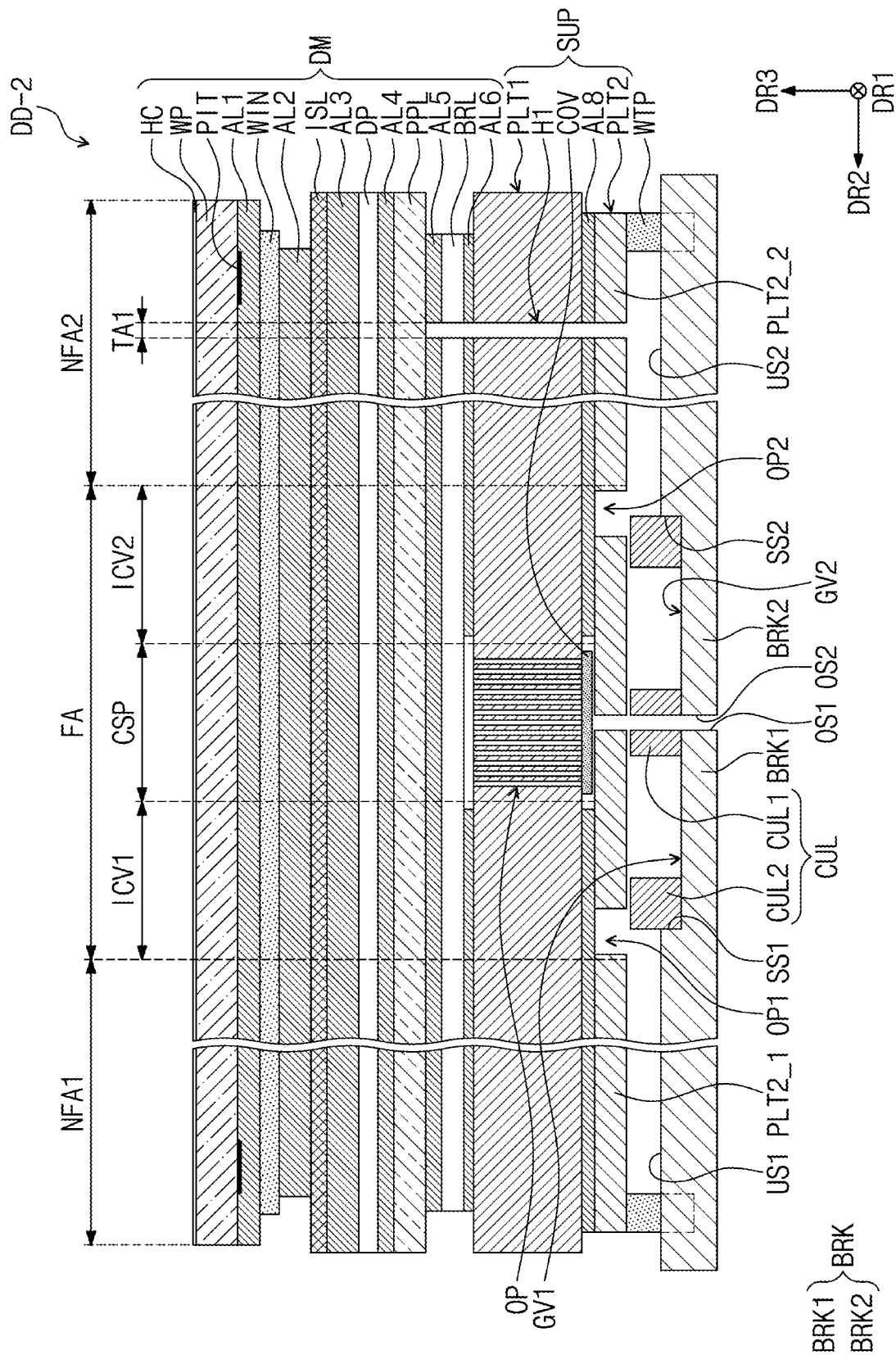
FIG. 16 is a diagram showing the configuration of a display device according to another alternative embodiment of the invention.

FIG. 16 is a diagram showing the configuration of a display device according to another embodiment of the invention.

Particularly, FIG. 16 is a cross-sectional view corresponding to FIG. 11. Hereinafter, the configuration of the display device DD-2 shown in FIG. 16 will be described, focusing on a configuration different from the display device DD shown in FIG. 11.

Referring to FIG. 16, in an embodiment, the display device DD-2 may not include the digitizer DGT, the seventh adhesive layer AL7, and the shielding layer SHL shown in FIG. 11.

In such an embodiment, the eighth adhesive layer AL8 may be disposed between the first support plate PLT1 and the second support plate PLT2. The first support plate PLT1 and the second support plate PLT2 may be attached to each other by the eighth adhesive layer AL8. First and second opening parts OP1 and OP2 may be defined on the second support plate PLT2.

The eighth adhesive layer AL8 may be opened at a portion overlapping the curved part CSP not to be disposed under the curved part CSP. The cover layer COV may be disposed on the opening part of the eighth adhesive layer AL8.

Figure 17:
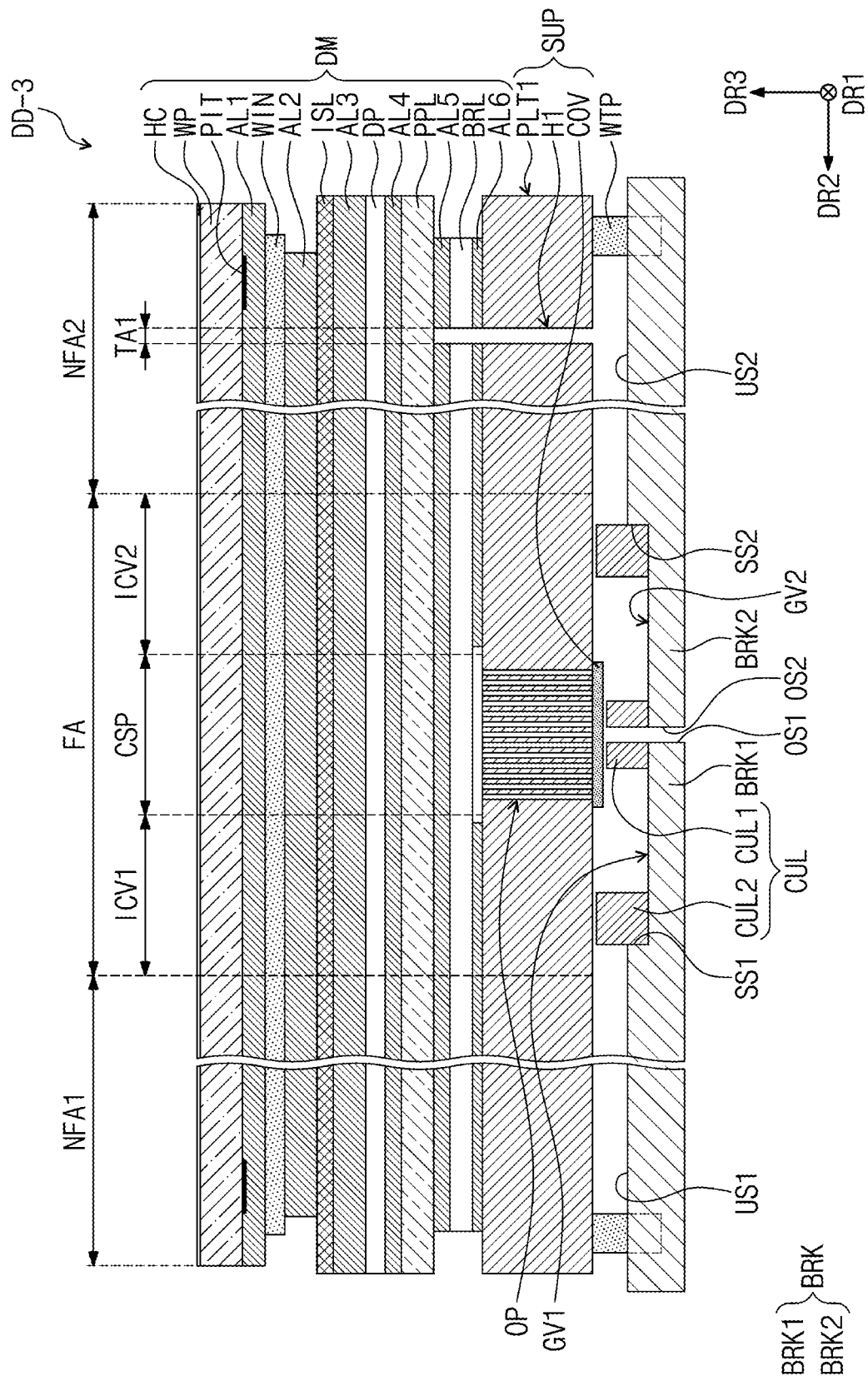
FIG. 17 is a diagram showing the configuration of a display device according to another alternative embodiment of the invention.

FIG. 17 is a diagram showing the configuration of a display device according to another embodiment of the invention.

Particularly, FIG. 17 is a cross-sectional view corresponding to FIG. 11. Hereinafter, the configuration of the display device DD-3 shown in FIG. 17 will be described, focusing on a configuration different from the display device DD shown in FIG. 11.

Referring to FIG. 17, in an embodiment, the display device DD-3 may not include the digitizer DGT, the shielding layer SHL, the second support plate PLT2, and the seventh and eighth adhesive layers AL7 and AL8 shown in FIG. 11.

The cushion layers CUL and waterproof tapes WTP may be disposed between the first support plate PLT1 and the bracket BRK. The waterproof tapes WTP may be attached to the lower surface of the first support plate PLT1. The cushion layers CUL may not be attached to the first support plate PLT1 and the cover layer COV.

Figure 18:
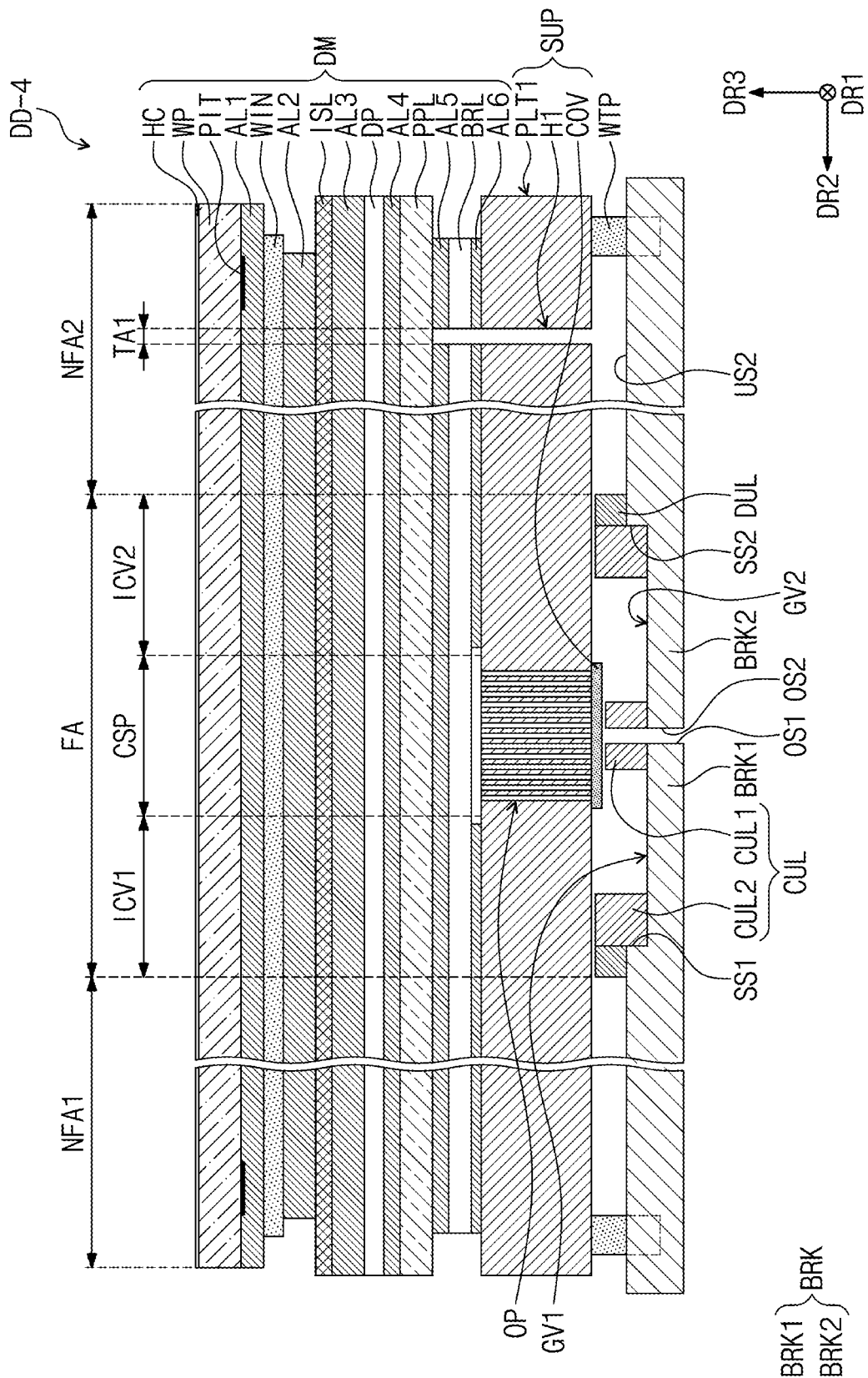
FIG. 18 is a diagram showing the configuration of a display device according to another alternative embodiment of the invention.

FIG. 18 is a diagram showing the configuration of a display device according to another alternative embodiment of the invention.

Particularly, FIG. 18 is a cross-sectional view corresponding to FIG. 11. Hereinafter, the configuration of the display device DD-4 shown in FIG. 18 will be described, focusing on a configuration different from the display device DD shown in FIG. 11.

Referring to FIG. 18, in an embodiment, the display device DD-4 may further include a plurality of dummy layers DUL disposed on upper surfaces US1 and US2 of portions of the first and second brackets BRK1 and BRK2 adjacent to the first and second grooves GV1 and GV2. The dummy layers DUL may be disposed between the first support plate PLT1 and the bracket BRK. The dummy layers DUL may contact side surfaces of the second cushion layers CUL2.

The dummy layers DUL may include various materials such as an adhesive tape, a plastic material such as PI or PET, or a metal. The dummy layers DUL may compensate for a gap between the first support plate PLT1 and the bracket BRK.

The space between the first support plate PLT1 and the bracket BRK may be maintained more flat by the dummy layers DUL and the waterproof tapes WTP. In such an embodiment, when the display module DM is folded as shown in FIG. 13, the first and second non-folding areas NFA1 and NFA2 may be maintained more flat on the first support plate PLT1.

FIGS. 19 to 23 are views showing the configurations of the first support plate according to various embodiments of the invention.

Hereinafter, the configurations of embodiment of the first support plate PLT1-1 to PLT1-5 shown in FIGS. 19 to 23 will be described mainly with a configuration different from the first support plate PLT1 shown in FIG. 11.

Referring to FIGS. 19 to 21, embodiments of the first support plate PLT1-1 to PLT1-3 may be applied to the display devices DD-2 to DD-4 shown in FIGS. 16 to 18 that do not include the digitizer DGT. Embodiments of the first support plate PLT1-1 to PLT1-3 may include a metal material such as stainless steel. In an embodiment, for example, embodiments of the first support plate PLT1-1 to PLT1-3 may include SUS 304, but are not limited thereto and may include various metal materials.

Referring to FIG. 19, in an embodiment, a plurality of grooves GV-1 may be defined in portions of a lower surface of the first support plate PLT1-1 overlapping the first and second inverse curvature parts ICV1 and ICV2. In such an embodiment, flexibility of portions of the first support plate PLT1-1 overlapping the first and second inverse curvature parts ICV1 and ICV2 may be increased by the grooves GV-1. Accordingly, portions of the first support plate PLT1-1 overlapping the first and second inverse curvature parts ICV1 and ICV2 may be more easily bent.

Referring to FIG. 20, in an alternative embodiment, a plurality of grooves GV-2 may be defined in portions of a lower surface of the first support plate PLT1-2 overlapping the first and second inverse curvature parts ICV1 and ICV2. In such an embodiment, each of the grooves GV-2 may be defined as a single groove in the portion of the lower surface of the first support plate PLT1-2 overlapping the first inverse curvature part ICV1 and the portion of the lower surface of the first support plate PLT1-2 overlapping the second inverse curvature part ICV2. Accordingly, flexibility of portions of the first support plate PLT1-2 overlapping the first and second inverse curvature parts ICV1 and ICV2 may be increased by the grooves GV-2.

Referring to FIG. 21, in another alternative embodiment, dummy opening parts DOP may be defined in portions of the first support plate PLT1-3 overlapping the first and second inverse curvature parts ICV1 and ICV2. In such an embodiment, flexibility of portions of the first support plate PLT1-3 overlapping the first and second inverse curvature parts ICV1 and ICV2 may be increased by the dummy opening parts DOP.

Figure 23:
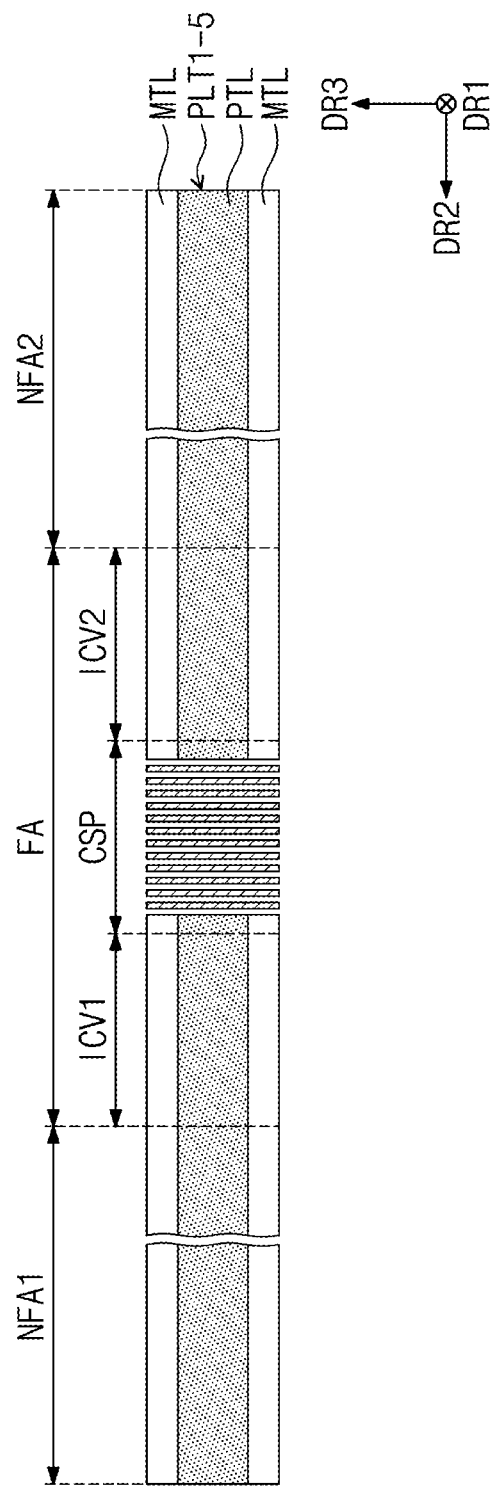

Referring to FIGS. 22 and 23, in other alternative embodiments, each of the first support plates PLT1-4 and PLT1-5 may include at least one metal layer MTL including a metal and at least one plastic layer PTL including a plastic material and disposed on one surface of the at least one metal layer MTL. In such an embodiment, the thickness of the metal layer MTL becomes relatively small and the plastic layer PTL having higher flexibility than the metal layer MTL is laminated together with the metal layer MTL, such that the flexibility of the first support plates PLT1-4 and PLT1-5 may be increased.

Figure 24:
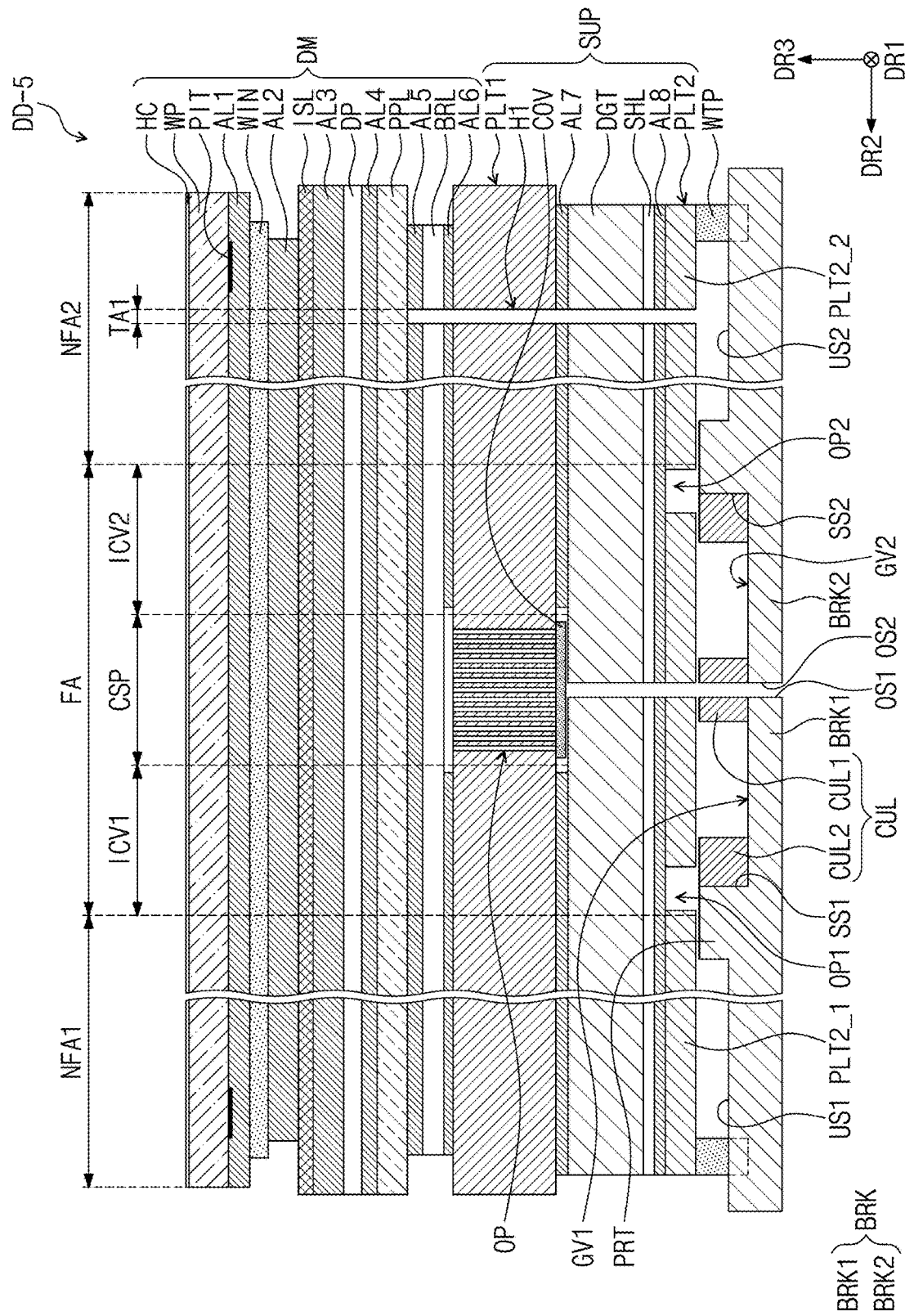
FIGS. 24 and 25 are views showing configurations of a display device according to other alternative embodiments of the invention.
Figure 25:
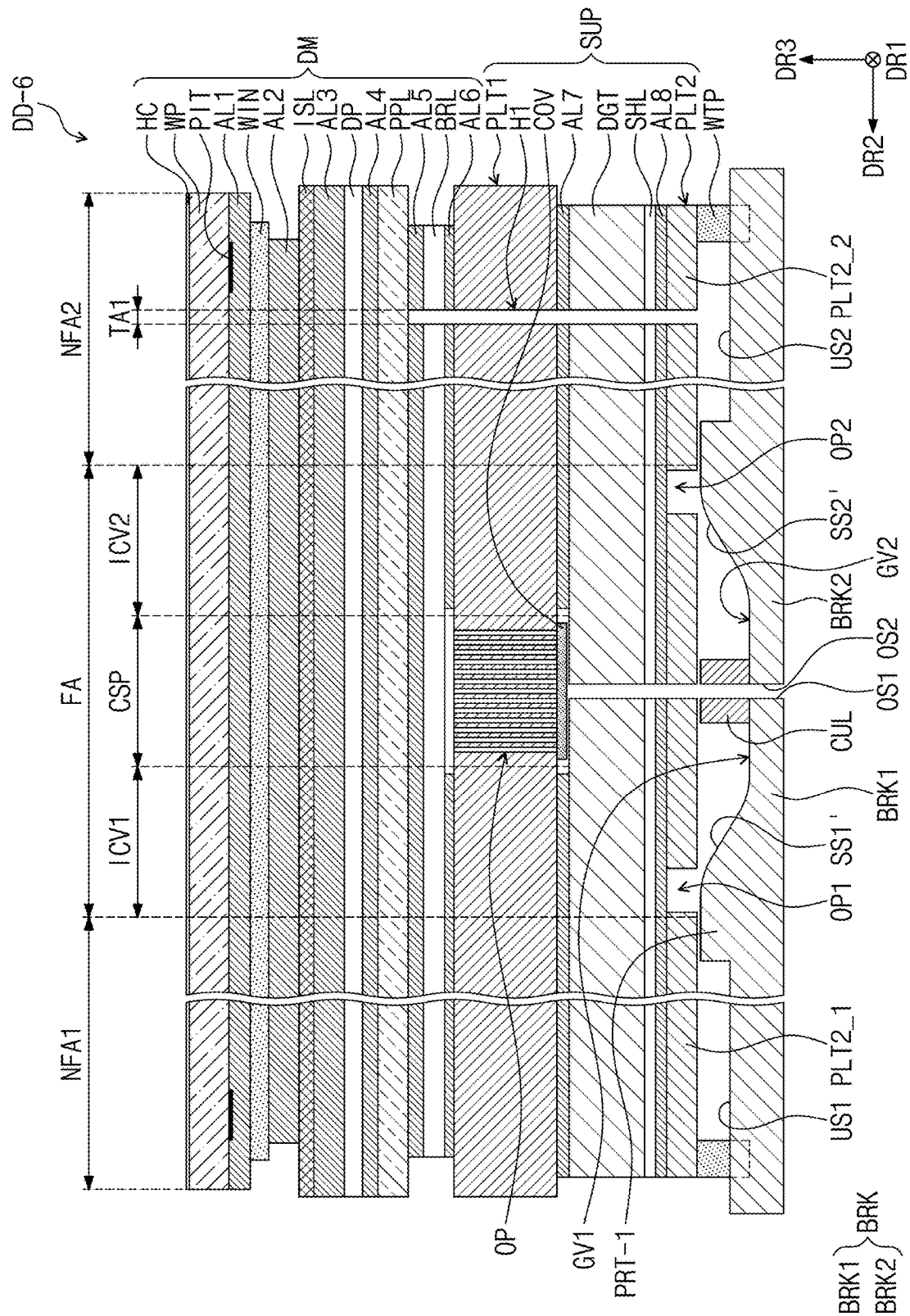

FIGS. 24 and 25 are views showing configurations of display devices according to other alternative embodiments of the invention.

Particularly, FIGS. 24 and 25 are cross-sectional views corresponding to FIG. 11.

Hereinafter, configurations of the display devices DD-5 and DD-6 shown in FIGS. 24 and 25 will be described, focusing on a configuration different from the display device DD shown in FIG. 11.

Referring to FIG. 24, in an embodiment, the display device DD-5 may include a plurality of protruding parts PRT formed as portions of the first and second brackets BRK1 and BRK2 protrude. The protruding parts PRT may protrude upward toward the second support plate PLT2 at portions of the first and second brackets BRK1 and BRK2 adjacent to the first and second grooves GV1 and GV2. The protruding parts PRT may perform the same function as the aforementioned dummy layers DUL.

Referring to FIG. 25, in an alternative embodiment, the cushion layers CUL may be disposed adjacent to one side OS1 of the first bracket BRK1 and one side OS2 of the second bracket BRK2. The cushion layers CUL may correspond to the first cushion layers CUL1 described above. The display device DD-6 may not include the above-described second cushion layers CUL2.

At portions of the first and second brackets BRK1 and BRK2 adjacent to the first and second grooves GV1 and GV2, protruding parts PRT-1 protruding upward toward the second support plate PLT2 may be formed on the first and second brackets BRK1 and BRK2.

The side surfaces SS1' and SS2' formed between the protruding parts PRT-1 and the first and second grooves GV1 and GV2 may have inclined surfaces. The side surfaces SS1" and SS2" may have a curved shape that is gradually lowered as being closer to the cushion layers CUL. When the folding area FA is folded, the first and second inverse curvature parts ICV1 and ICV2 may be more easily bent by the curved side surfaces SS1' and SS2'.

According to embodiments of the invention, a first groove and a second groove overlapping the folding area are respectively defined in the first bracket and the second bracket disposed under the support part, and the cushion layers spaced apart from each other may be arranged in the first and second grooves, respectively. In such embodiments, when the display module is folded, the display module may be bent between the cushion layers and may extend along upper surfaces of the first and second brackets in which the first and second grooves are not formed. Accordingly, the display module may be more easily folded into a dumbbell shape.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
   a display panel;
   a first support plate disposed under the display panel;
   a first bracket disposed under the first support plate;
   a second bracket disposed under the first support plate and horizontally spaced apart from the first bracket; and
   a plurality of cushion layers disposed in a first groove defined on an upper surface of a portion of the first bracket adjacent to the second bracket and a second groove defined on an upper surface of a portion of the second bracket adjacent to the first bracket,
   wherein the first groove extends in a direction perpendicular to a thickness direction of the first bracket from an end of the upper surface of the portion of the first bracket at one side thereof facing the second bracket, and the second groove extends in a direction perpendicular to a thickness direction of the second bracket from an end of the upper surface of the portion of the second bracket at one side thereof facing the first bracket, and
   wherein the cushion layers are spaced apart from each other at a boundary between the first and second brackets.

2. The display device of claim 1, wherein the cushion layers comprise:
   a plurality of first cushion layers adjacent to the one side of the first bracket and the one side of the second bracket facing each other; and a plurality of second cushion layers adjacent to a first boundary between the first groove and the upper surface of the first bracket where the first groove is not defined and a second boundary between the second groove and the upper surface of the second bracket where the second groove is not defined.

3. The display device of claim 2, wherein the second cushion layers are in contact with side surfaces at the first and second boundaries, respectively.

4. The display device of claim 2, further comprising:
a first second support plate disposed between the first support plate and the first bracket; and
a second second support plate disposed between the first support plate and the second bracket,
wherein a first opening part is defined in a portion of the first second support plate to overlap the first boundary, and a second opening part is defined in a portion of the second second support plate to overlap the second boundary.

5. The display device of claim 4, wherein the display panel comprises:
a first non-folding area overlapping the first second support plate;
a second non-folding area overlapping the second second support plate; and
a folding area including a first inverse curvature part, a second inverse curvature part, and a curved part between the first inverse curvature part and the second inverse curvature part,
wherein a plurality of opening parts are defined in a portion of the first support plate to overlap the curved part, and
the first and second opening parts overlap the first and second inverse curvature parts, respectively.

6. The display device of claim 5,
wherein the folding area is foldable based on a folding axis extending in a first direction, and the first and second non-folding areas and the folding area are arranged in a second direction intersecting the first direction;
wherein, when the curved part is bent such that the display panel is folded, the first and second inverse curvature parts are symmetrical to each other and curved opposite to the curved part,
wherein a distance from a boundary between the curved part and the first and second inverse curvature parts to ends of the first and second non-folding areas is defined as a distance measured in the second direction, and
centers of the first and second opening parts are spaced from the boundary with about 30% of the distance from the boundary to the ends of the first and second non-folding areas.

7. The display device of claim 4, wherein the first and second cushion layers are disposed between the first second and second second support plates and the first and second brackets, and the first and second cushion layers are attached to the first and second brackets, and are not attached to the first second and second second support plates.

8. The display device of claim 4, further comprising:
a plurality of waterproof tapes disposed between the first second and second second support plates and the first and second brackets, and adjacent to edges of the first and second brackets which do not face each other.

9. The display device of claim 8, wherein lower portions of the waterproof tapes are disposed in recesses defined in portions of the upper surfaces of the first and second brackets.

10. The display device of claim 4, further comprising:
a shielding layer disposed between the first support plate and the first second and second second support plates,
wherein the first and second opening parts are further defined in the shielding layer.

11. The display device of claim 10, further comprising:
a digitizer disposed between the first support plate and the shielding layer,
wherein a plurality of additional grooves respectively overlapping the first and second opening parts are defined in a lower surface of the digitizer.

12. The display device of claim 11, wherein the digitizer comprises:
a base layer;
a first conductive pattern disposed on the base layer;
a second conductive pattern disposed under the base layer; and
a sub-shielding layer disposed under the second conductive pattern,
wherein the additional grooves are defined in the sub-shielding layer.

13. The display device of claim 11, further comprising:
a plurality of additional shielding layers disposed on upper surfaces of portions of the first and second brackets adjacent to the first and second grooves and overlapping the additional grooves.

14. The display device of claim 1, further comprising:
a plurality of additional layers disposed on upper surfaces of portions of the first and second brackets adjacent to the first and second grooves.

15. The display device of claim 1, further comprising:
a plurality of protruding parts protruding upward from portions of the first and second brackets adjacent to the first and second grooves.

16. The display device of claim 15,
wherein the cushion layers are disposed adjacent to the one side of the first bracket and the one side of the second bracket facing each other,
wherein side surfaces of the first and second brackets formed between the protruding parts and the first and second grooves have inclined surfaces,
wherein the side surfaces of the first and second brackets have a curved shape which is gradually lowered as being closer to the cushion layers.

17. The display device of claim 1,
wherein the display panel comprises a first non-folding area, a second non-folding area, and a folding area between the first and second non-folding areas,
wherein the folding area comprises a first inverse curvature part, a second inverse curvature part, and a curved part between the first curvature part and the second inverse curvature part,
wherein a plurality of opening parts are defined in a portion of the first support plate to overlap the curved part, and
a groove or an additional opening part is defined in portions of the first support plate overlapping the first and second inverse curvature parts.

18. The display device of claim 1, wherein the first support plate comprises:
a metal layer; and
a plastic layer disposed on a surface of the metal layer.

19. A display device comprising:
a display panel;
a first support plate disposed under the display panel;
a first second support plate disposed under the first support plate;

a second second support plate disposed below the first support plate and horizontally spaced apart from the first second support plate;

a first bracket disposed under the first second support plate;

a second bracket disposed under the second second support plate; and a cushion layer disposed in a groove defined in an upper surface of a portion of the first bracket adjacent to the second bracket, wherein the groove extends in a direction perpendicular to a thickness direction of the first bracket from an end of the upper surface of the portion of the first bracket at one side thereof facing the second bracket, wherein an opening part is defined in a portion of the first second support plate to overlap a boundary between the groove and the upper surface of the first bracket where the groove is not defined, and wherein the cushion layers are spaced apart from each other at a boundary between the first and second brackets.

20. A display device comprising:

a display panel;

a first support plate disposed under the display panel;

a second support plate disposed below the first support plate;

a digitizer disposed under the second support plate;

a first bracket disposed under the digitizer;

a second bracket disposed under the digitizer and horizontally spaced apart from the first bracket; and a plurality of cushion layers disposed in a first groove defined in an upper surface of the first bracket and a second groove defined in an upper surface of the second bracket, wherein the first groove is defined from one side of the first bracket facing the second bracket, and the second groove is defined from one side of the second bracket facing the first bracket, wherein an opening part is defined in a portion of the second support plate to overlap a boundary between the first groove and an upper surface of the first bracket where the first groove is not defined, and an additional groove is defined in a lower surface of the digitizer to overlap the opening part.

21. A electronic device comprising:

a camera capturing an external image; and a display device displaying the external image captured by the camera, wherein the display device comprises:

a display panel;

a first support plate disposed under the display panel;

a first bracket disposed under the first support plate;

a second bracket disposed under the first support plate and horizontally spaced apart from the first bracket; and a plurality of cushion layers disposed in a first groove defined on an upper surface of a portion of the first bracket adjacent to the second bracket and a second groove defined on an upper surface of a portion of the second bracket adjacent to the first bracket, wherein the first groove extends in a direction perpendicular to a thickness direction of the first bracket from an end of the upper surface of the portion of the first bracket at one side thereof facing the second bracket, and the second groove extends in a direction perpendicular to a thickness direction of the second bracket from an end of the upper surface of the portion of the second bracket at one side thereof facing the first bracket, and wherein the cushion layers are spaced apart from each other at a boundary between the first and second brackets.

* * * * *